United States Patent
Nakadai et al.

(10) Patent No.: US 11,320,825 B2
(45) Date of Patent: May 3, 2022

(54) VEHICLE CONTROL SYSTEM, SELF-DRIVING VEHICLE, VEHICLE CONTROL METHOD, AND PROGRAM

(71) Applicant: NEC Corporation, Tokyo (JP)

(72) Inventors: Shinji Nakadai, Tokyo (JP); Satoshi Morinaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 49 days.

(21) Appl. No.: 16/499,376

(22) PCT Filed: Mar. 30, 2017

(86) PCT No.: PCT/JP2017/013274
§ 371 (c)(1),
(2) Date: Sep. 30, 2019

(87) PCT Pub. No.: WO2018/179237
PCT Pub. Date: Oct. 4, 2018

(65) Prior Publication Data
US 2021/0109533 A1    Apr. 15, 2021

(51) Int. Cl.
*G05D 1/02* (2020.01)
*H04W 4/46* (2018.01)

(52) U.S. Cl.
CPC ......... *G05D 1/0214* (2013.01); *G05D 1/0276* (2013.01); *G05D 1/0289* (2013.01); *H04W 4/46* (2018.02)

(58) Field of Classification Search
CPC .. G05D 1/0214; G05D 1/0276; G05D 1/0289; H04W 4/46
See application file for complete search history.

(56) References Cited

U.S. PATENT DOCUMENTS

| | | | |
|---|---|---|---|
| 2015/0066282 A1* | 3/2015 | Yopp | G05D 1/0088 701/24 |
| 2017/0236422 A1 | 8/2017 | Naka et al. | |
| 2018/0079419 A1 | 3/2018 | Yamamoto | |
| 2019/0025825 A1* | 1/2019 | Takahama | B60W 60/0053 |

FOREIGN PATENT DOCUMENTS

| | | |
|---|---|---|
| JP | 2015-072650 A | 4/2015 |
| JP | 2016-071566 A | 5/2016 |
| WO | 2016/147622 A1 | 9/2016 |

OTHER PUBLICATIONS

International Search Report for PCT Application No. PCT/JP2017/013274, dated Jun. 27, 2017.

* cited by examiner

*Primary Examiner* — Rodney A Butler
(74) *Attorney, Agent, or Firm* — Sughrue Mion, PLLC

(57) ABSTRACT

The non-traveling area plan creating unit 4 creates a plan of the non-traveling area, which is an area where the self-driving vehicle 10 can travel and which is an area set as an area where the self-driving vehicle 10 does not travel. The negotiation area information receiving unit 9 receives, from another vehicle, information on one or more negotiation areas each of which is an area other than the non-traveling area and is a subject of negotiation to be included in the non-traveling area. The permissible area determining unit 35 calculates, for each negotiation area, the first value which is the value of the negotiation area indicated by the information for the self-driving vehicle 10, and determines one negotiation area permissible to be included in the non-traveling area, or determines not to include any negotiation area in the non-traveling area.

17 Claims, 21 Drawing Sheets

FIG. 2
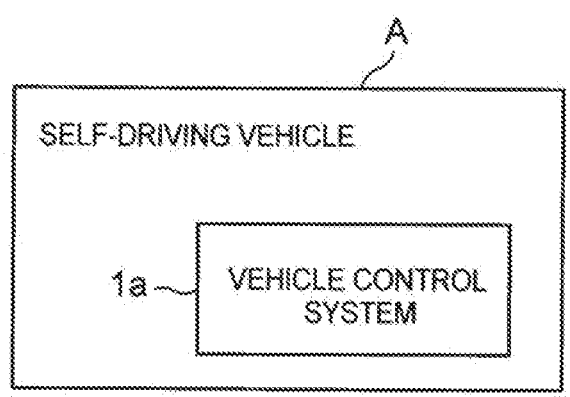
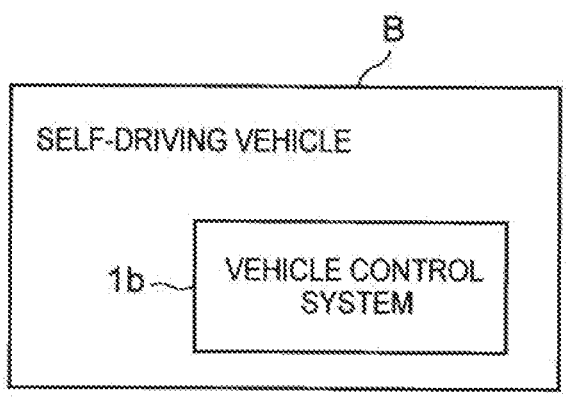

VEHICLE CONTROL SYSTEM, SELF-DRIVING VEHICLE, VEHICLE CONTROL METHOD, AND PROGRAM

This application is a National Stage Entry of PCT/JP2017/013274 filed on Mar. 30, 2017, the contents of all of which are incorporated herein by reference, in their entirety.

TECHNICAL FIELD

The present invention relates to a vehicle control system, a self-driving vehicle, a vehicle control method, and a vehicle control program.

BACKGROUND ART

PTL 1 describes that when vehicles change lanes or join together by automatic driving, the vehicles perform the traveling operation after communicating with each other for safety confirmation by inter-vehicle communication in advance. In the technology described in PTL 1, a lane change vehicle that is going to change lanes transmits a lane change request signal to a following vehicle traveling on the destination lane. Upon receipt of the lane change request signal, the following vehicle determines whether to allow lane change depending on whether the inter-vehicle distance between the following vehicle and the lane change vehicle is equal to or less than a predetermined threshold value, and transmits a permission response to the lane change vehicle when permitting the lane change. The lane change vehicle actually changes lanes when determining that a permission response to the lane change request has been received from the following vehicle.

CITATION LIST

Patent Literature

PTL 1: International Publication No. 2016/147622

SUMMARY OF INVENTION

Technical Problem

The lane change vehicle described in PTL 1 transmits a lane change request signal to a following vehicle, and actually changes lanes when receiving a permission response from the following vehicle.

Here, it is preferable that a self-driving vehicle that transmits some information to another vehicle can change the content of the information according to the response from the other vehicle and transmit the information to the other vehicle again. It is because self-driving vehicles can negotiate smoothly if such a thing can be done.

Therefore, the present invention aims at providing a vehicle control system, a self-driving vehicle, a vehicle control method, and a vehicle control program which after transmitting information to another vehicle, can change the content of the information according to the response from the other vehicle and transmit the information to the other vehicle again.

Solution to Problem

The vehicle control system according to the present invention is a vehicle control system provided in a self-driving vehicle, the vehicle control system including: a planned route creating unit that creates a planned route of the self-driving vehicle; a non-traveling area plan creating unit that creates a plan of a non-traveling area, which is an area where the self-driving vehicle can travel and which is an area set as an area where the self-driving vehicle does not travel; a transmission unit that transmits the plan of the non-traveling area to another vehicle; a negotiation area information receiving unit that receives, from the other vehicle, information on one or more negotiation areas each of which is an area other than the non-traveling area and which is a subject of negotiation to be included in the non-traveling area; and a permissible area determining unit that calculates, for each negotiation area, a first value which is a value of the negotiation area indicated by the information for the self-driving vehicle, and based on the first value calculated for each negotiation area, determines one negotiation area permissible to be included in the non-traveling area or determines not to include any negotiation area in the non-traveling area, in which the non-traveling area plan creating unit, when the permissible area determining unit has determined one negotiation area permissible to be included in the non-traveling area, creates a new non-traveling area plan in which the negotiation area is included in the non-traveling area, and the transmission unit transmits the new non-traveling area plan to the other vehicle.

Further, a vehicle control method according to the present invention, by a computer provided in a self-driving vehicle, includes: creating a planned route of the self-driving vehicle; creating a plan of a non-traveling area, which is an area where the self-driving vehicle can travel and which is an area set as an area where the self-driving vehicle does not travel; transmitting the plan of the non-traveling area to another vehicle; receiving, from the other vehicle, information on one or more negotiation areas each of which is an area other than the non-traveling area and which is a subject of negotiation to be included in the non-traveling area; calculating, for each negotiation area, a first value which is a value of the negotiation area indicated by the information for the self-driving vehicle, and based on the first value calculated for each negotiation area, determining one negotiation area permissible to be included in the non-traveling area or determining not to include any negotiation area in the non-traveling area; creating, when having determined one negotiation area permissible to be included in the non-traveling area, a new non-traveling area plan in which the negotiation area is included in the non-traveling area; and transmitting the new non-traveling area plan to the other vehicle.

Further, a vehicle control program according to the present invention is a vehicle control program installed in a computer provided in a self-driving vehicle, the vehicle control program for causing the computer to execute: planned route creation processing for creating a planned route of the self-driving vehicle; non-traveling area plan creation processing for creating a plan of a non-traveling area, which is an area where the self-driving vehicle can travel and which is an area set as an area where the self-driving vehicle does not travel; transmission processing for transmitting the plan of the non-traveling area to another vehicle; negotiation area information receiving processing for receiving, from the other vehicle, information on one or more negotiation areas each of which is an area other than the non-traveling area and is a subject of negotiation to be included in the non-traveling area; and permissible area determination processing for calculating, for each negotiation area, a first value which is a value of the negotiation area indicated by the information for the self-driving vehicle, and based on the first value calculated for each negotiation area, determining one negotiation area permissible to be included in the non-traveling area or determining not to include any negotiation area in the non-traveling area, when having determined one negotiation area permissible to be included in the non-traveling area in the permissible area determination processing, creating a new non-traveling area plan in which the negotiation area is included in the non-traveling area, and the transmission processing transmits the new non-traveling area plan to the other vehicle.

Advantageous Effects of Invention

According to the present invention, after transmitting information to another vehicle, it is possible to change the content of the information according to the response from the other vehicle and transmit the information to the other vehicle again.

BRIEF DESCRIPTION OF DRAWINGS

FIG. 2 It depicts a schematic diagram showing a plurality of self-driving vehicles each provided with a vehicle control system.

DESCRIPTION OF EMBODIMENTS

Figure 1:
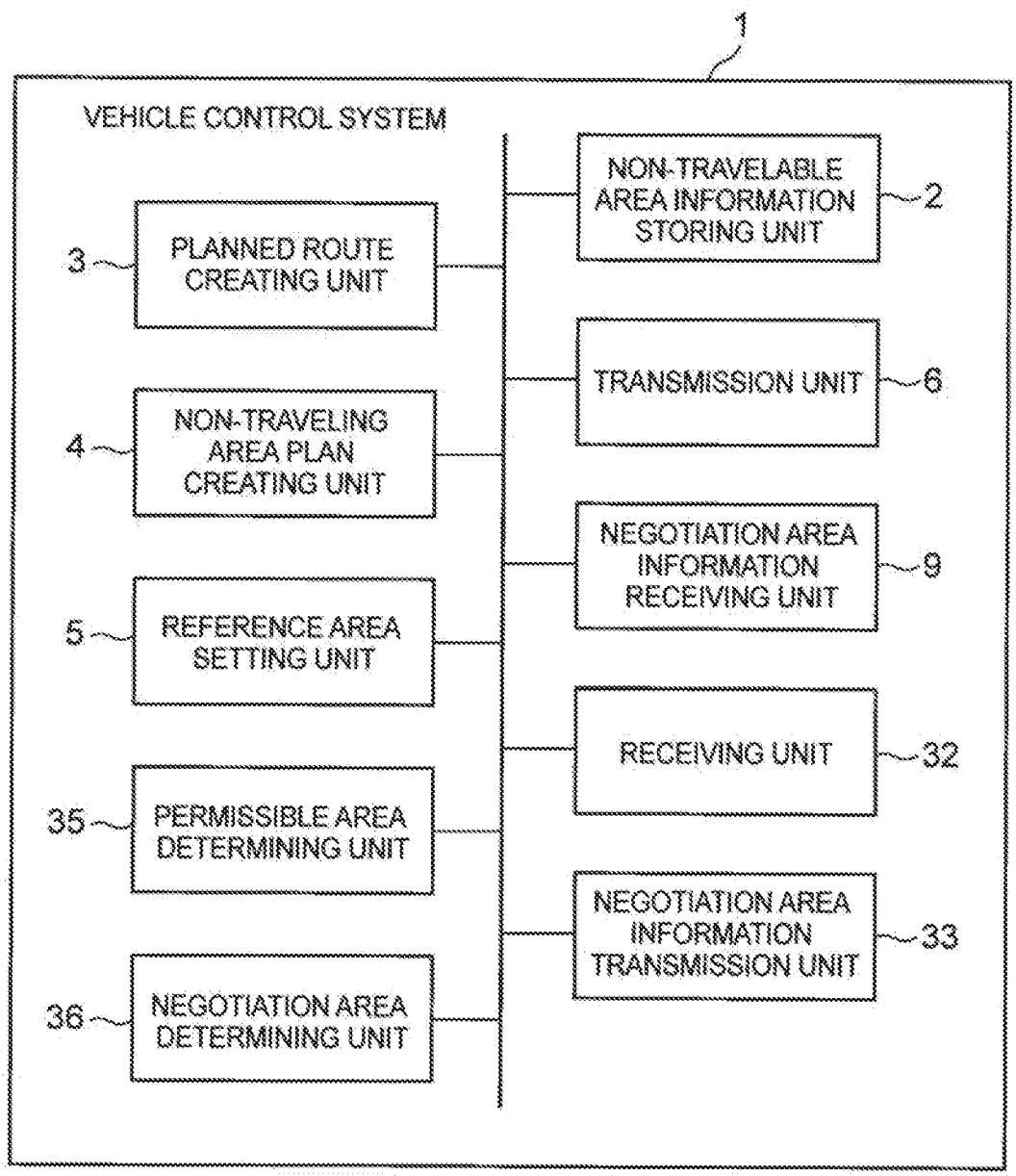
FIG. 1 It depicts a block diagram showing an example of a vehicle control system of the present invention.

An exemplary embodiment of the present invention will be described below with reference to drawings.

First, terms used to explain the present invention will be described.

In the present invention, a "self-driving vehicle" may be a car that the driver does not drive in any case while traveling, and may be a car driven by the driver in a case where the driver completely gives control to the car under a specific traffic condition and that specific traffic condition is not fulfilled. In the former case, it may be unattended.

Moreover, the "self-driving vehicle" of this invention can also be called an "autonomous traveling vehicle".

The "non-travelable area" is an area where the vehicle cannot travel physically or legally.

Specific examples of an area where a vehicle cannot travel physically include an area where there is an obstacle such as a telegraph pole, a position in a direction forming 90° with the traveling direction as the position after 0.1 seconds with respect to the current position, and a position at a distance of 10 meters or more from the current position as the position within 0.1 seconds in the traveling direction.

Further, specific examples of an area where a vehicle cannot legally travel include a sidewalk, a place inside a building or a park, an intersection of red lights, and a one-way road when traveling is reverse travel.

A "travelable area" is an area where a self-driving vehicle or a driver can travel physically and legally if it attempts to travel.

The "planned route" is a route planned by a self-driving vehicle as a traveling route. The self-driving vehicle sets a planned route within the travelable area. In the planned route, the time is associated with the position of the self-driving vehicle.

The "non-traveling area" is an area within the travelable area and set as an area where the self-driving vehicle does not travel. In other words, the "non-traveling area" is an area where the self-driving vehicle can travel and is an area set as an area where the self-driving vehicle does not travel.

The non-traveling area is an area set as an area where the self-driving vehicle can travel but does not travel, and is distinguished from a "non-travelable area" where it is originally not possible to travel. That is, the non-traveling area does not overlap with the non-travelable area. The definition of such terms is not intended to exclude the manner in which the self-driving vehicle described later transmits and receives an area including the non-traveling area and the non-travelable area.

The vehicle system of the present invention is provided in a self-driving vehicle and controls traveling of the self-driving vehicle. The vehicle system of the present invention executes "mission planning", "motion planning", and "control" as the operation of creating a plan for traveling of a self-driving vehicle.

The "mission planning" is, for example, an operation of setting a mission such as "turn right", "change lanes to left lane", "stop", "turn around", or the like. The mission may be referred to as a target state.

The "motion planning" is an operation of creating a planned route so as to achieve a mission, which is an output of mission planning.

The "control" is an operation of creating control information for controlling an accelerator, a brake, a steering, etc., so that a self-driving vehicle travels along a planned route.

The vehicle system of the present invention, for example, performs "mission planning" at 2 Hz, for example, performs "motion planning" at 25 Hz, and performs "control" at 10 Hz, for example.

FIG. 1 is a block diagram showing an example of a vehicle control system of the present invention. A vehicle control system 1 according to the present invention includes a non-travelable area information storing unit 2, a planned route creating unit 3, a non-traveling area plan creating unit 4, a reference area setting unit 5, a transmission unit 6, a negotiation area information receiving unit 9, a permissible area determining unit 35, a receiving unit 32, a negotiation area determining unit 36, and a negotiation area information transmission unit 33.

FIG. 2 is a schematic diagram showing a plurality of self-driving vehicles each provided with the vehicle control system 1. Although two self-driving vehicles A and B are illustrated in FIG. 2, the number of self-driving vehicles each provided with the vehicle control system 1 is not limited. Hereinafter, in order to simplify the description, the description will be made using two self-driving vehicles A and B as appropriate. The vehicle control system 1 provided in the self-driving vehicle A and the vehicle control system 1 provided in the self-driving vehicle B have the same configuration (see FIG. 1). In addition, when the vehicle control system 1 provided in the self-driving vehicle A and the vehicle control system 1 provided in the self-driving vehicle B are distinguished, the former is represented by adding a suffix "a" to the code "1" and the latter is represented by adding a suffix "b" to the code "1" (see FIG. 2). Similarly, with regard to each element in the vehicle control system 1 such as the planned route creating unit 3, the suffix "a" is added to the code when explicitly indicating that the element is provided in the self-driving vehicle A, and the suffix "b" is added to the code when explicitly indicating that the element is provided in the self-driving vehicle B. In the case where there is no need to distinguish between the self-driving vehicles A and B, the elements are represented without adding the suffix "a" or "b" to the codes.

Here, for descriptive purposes, the description will be given assuming that the self-driving vehicle having the vehicle control system 1 mounted thereon is the self-driving vehicle A.

The non-travelable area information storing unit 2 is a storage device for storing information (for example, information indicating an area where a sidewalk, a building, etc. exist) indicating the non-travelable area, and information (for example, information indicating an area of a one-way road) indicating an area that can become a non-travelable area depending on the state (for example, a traveling direction) of a self-driving vehicle or the like.

The planned route creating unit 3 creates a planned route of the self-driving vehicle A on which the vehicle control system 1 is mounted, in accordance with the mission (output of the mission control) which the vehicle control system 1 has already set. Creation of a planned route corresponds to the above-mentioned "motion planning". Note that, illustration of the part which performs mission control is omitted.

The planned route creating unit 3 refers to the non-travelable area information storing unit 2 and specifies the non-travelable area. Furthermore, the planned route creating unit 3 determines that the area other than the non-travelable area is the travelable area. The planned route creating unit 3 creates a planned route within the travelable area. The planned route creating unit 3 creates, as a planned route, a planned route including information indicating the correspondence between the time of day and the position of the self-driving vehicle A.

The planned route creating unit 3 may create a planned route using a known algorithm, for example, such as Rapidly-Exploring Random Trees (RRT) or A-star (A*). The algorithm used to create the planned route is not limited to RRT or A*.

Figure 3:
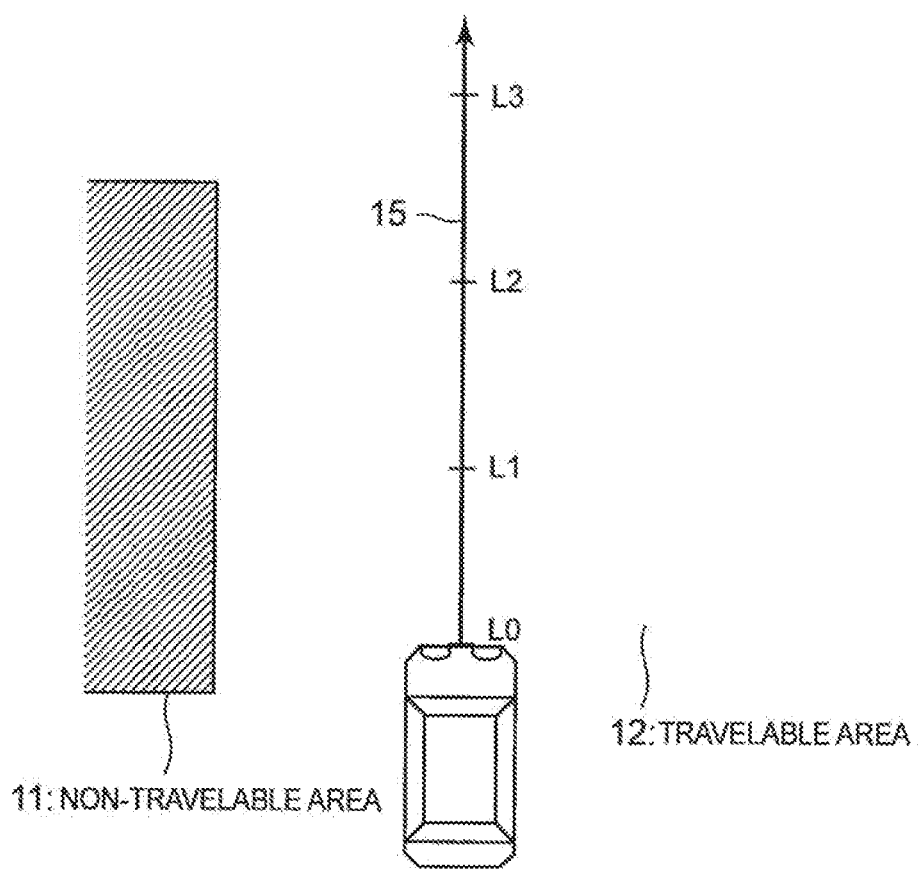
FIG. 3 It depicts a schematic diagram showing an example of a planned route.

FIG. 3 is a schematic diagram showing an example of a planned route. An area other than the non-travelable area 11 is a travelable area 12. The planned route creating unit 3 creates a planned route 15 within the travelable area 12. Although, for ease of explanation, FIG. 3 shows the case where the planned route 15 is a straight line, the planned route 15 may be a curve. In addition, t0 is the current time. t1, t2, and t3 are future times. In the example shown in FIG. 3, L0 is the position of the self-driving vehicle A at the current time t0. L1 is the position of the self-driving vehicle A at time t1. L2 is the position of the self-driving vehicle A at time t2. L3 is the position of the self-driving vehicle A at time t3.

The non-traveling area plan creating unit 4 creates a plan of the non-traveling area of the self-driving vehicle A on the basis of the planned route created by the planned route creating unit 3. As already described above, the non-traveling area is an area where the self-driving vehicle can travel and is an area set as an area where the self-driving vehicle does not travel.

The non-traveling area plan creating unit 4 creates a plan of the non-traveling area (hereinafter simply referred to as a non-traveling area plan) associated with the time. More specifically, the non-traveling area plan creating unit 4 creates a non-traveling area plan for each time zone.

Hereinafter, an example of the creation operation of the non-traveling area plan will be described. First, a first example of the creation operation of the non-traveling area plan will be described. In the first example, the non-traveling area plan creating unit 4 sets, as a non-traveling area, an area which is an area other than the area within Xm on both sides of the planned route and which does not overlap the non-travelable area 11, for each time zone. This means that the self-driving vehicle A (more specifically, the non-traveling area plan creating unit 4) determines not to travel in an area other than the area within Xm on both sides of the planned route.

Figure 4:
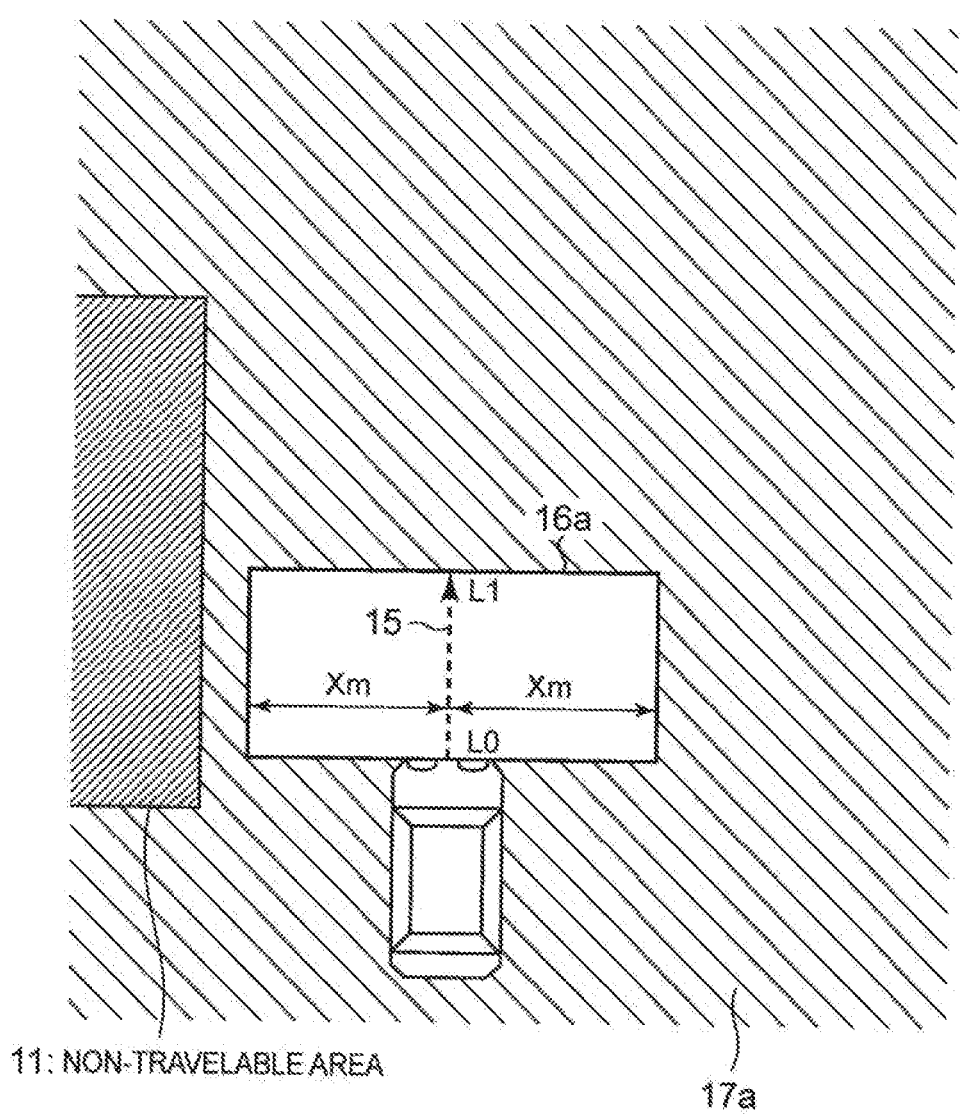
FIG. 4 It depicts a schematic diagram showing a non-traveling area of a self-driving vehicle A in a time zone t0 to t1.

FIG. 4 is a schematic diagram showing the non-traveling area of the self-driving vehicle A in the time zone t0 to t1. In FIG. 4, the planned route 15 in the time zone t0 to t1 is indicated by a broken line. An area 16a shown in FIG. 4 is an area within Xm on both sides of this planned route. Then, the non-traveling area plan creating unit 4 sets an area 17a which is an area other than the area 16*a* and does not overlap the non-travelable area 11, as a non-traveling area in the time zone t0 to t1.

Although the non-travelable area may also exist other than the non-travelable area 11 shown in FIG. 4, only the non-travelable area 11 is shown as the non-travelable area here in order to simplify the description. This point is the same in the other drawings such as FIG. 5.

Figure 5:
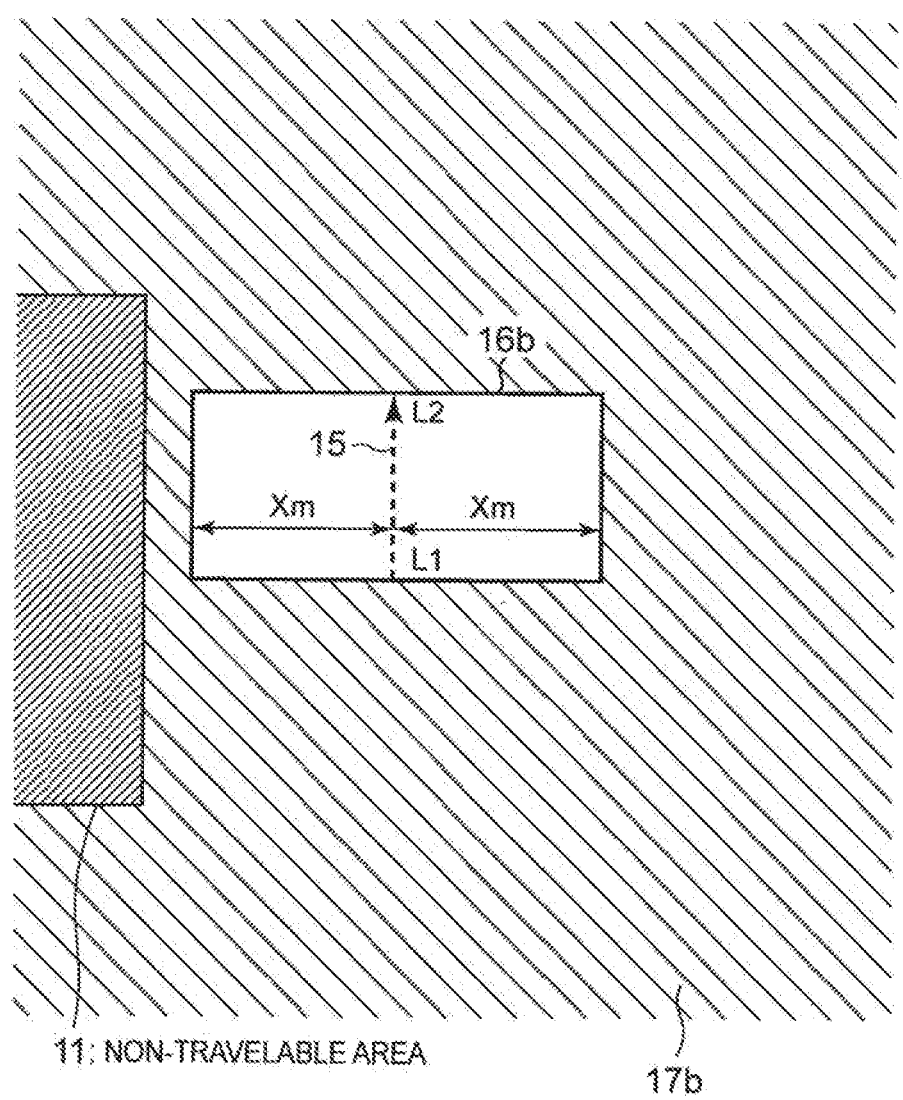
FIG. 5 It depicts a schematic diagram showing a non-traveling area of the self-driving vehicle A in a time zone t1 to t2.

FIG. 5 is a schematic diagram showing the non-traveling area of the self-driving vehicle A in the time zone t1 to t2. In FIG. 5, the planned route in the time zone t1 to t2 is indicated by a broken line. An area 16*b* shown in FIG. 5 is an area within Xm on both sides of this planned route. Then, the non-traveling area plan creating unit 4 sets an area 17*b* which is an area other than the area 16*b* and does not overlap the non-travelable area 11, as the non-traveling area in the time zone t1 to t2.

The non-traveling area plan creating unit 4 similarly sets the non-traveling area of the self-driving vehicle A also for each time zone after time t2. The length of the time zone (for example, t0 to t1, etc.) when setting the non-traveling area may be set in advance.

The non-traveling area set for each time zone is the non-traveling area plan. The above is the first example of the creation operation of the non-traveling area plan.

Figure 6:
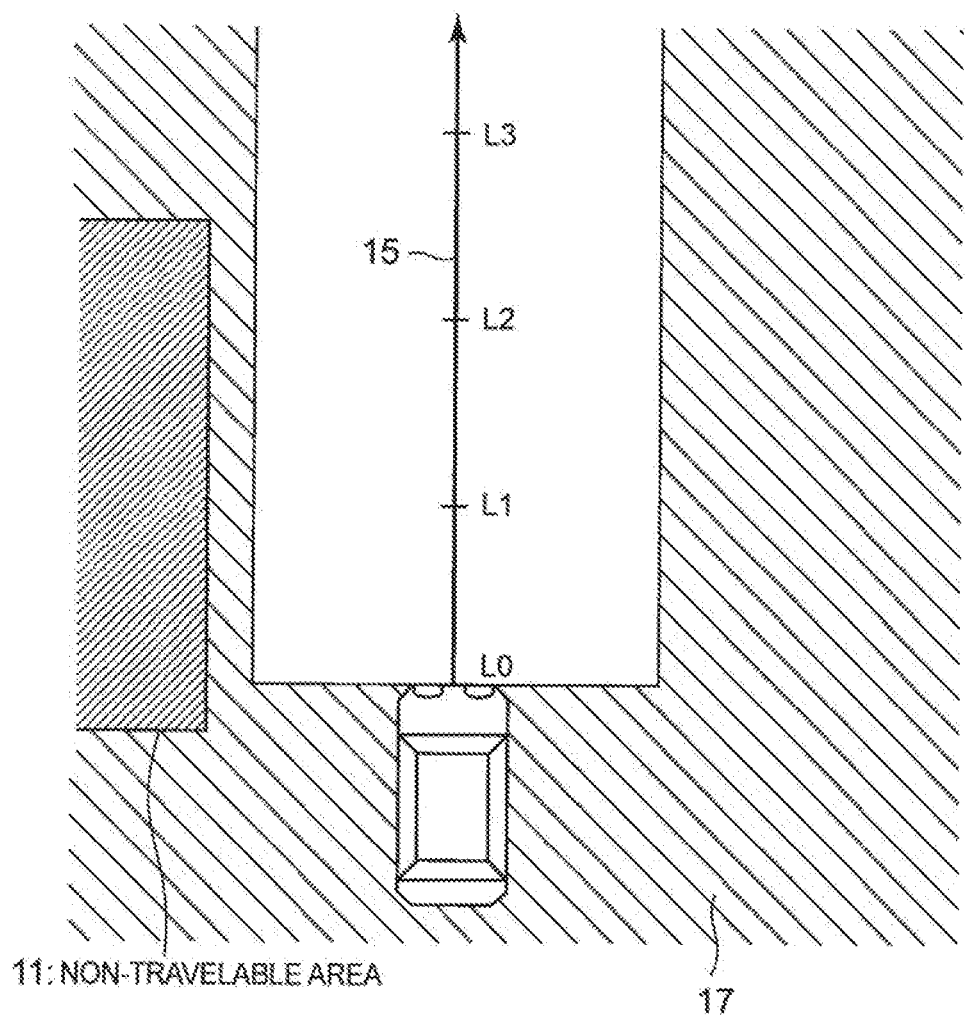
FIG. 6 It depicts a schematic diagram showing an example of a product set of non-traveling areas set for each time zone.

The product set of non-traveling areas set for each time zone as described above can be said to be an area which is an area within the travelable area and is set as an area where the self-driving vehicle does not travel at any time. FIG. 6 shows an example of a product set of non-traveling areas set for each time zone. The area 17 shown in FIG. 6 corresponds to this product set.

Next, a second example of a creation operation of the non-traveling area plan will be described. In this case, the planned route creating unit 3 obtains (derives) a plurality of planned routes by one or more algorithms in the process of finally setting one planned route. In this case, the planned route creating unit 3 sets an optimal planned route (for example, a planned route with the shortest route) from among the plurality of planned routes, as a final planned route.

In the second example, a non-traveling area plan is created based on a plurality of planned routes obtained by the planned route creating unit 3 in the process of setting the final planned route.

Figure 7:
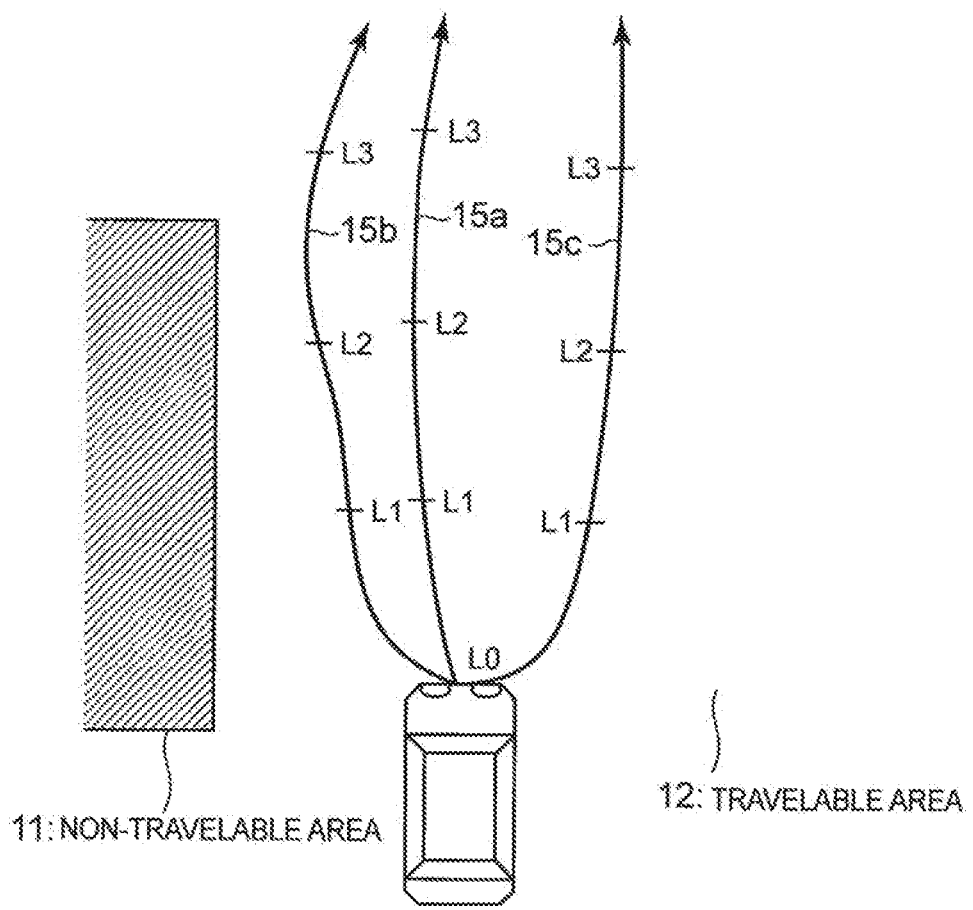
FIG. 7 It depicts an explanatory diagram showing an example of a plurality of planned routes.

FIG. 7 is an explanatory diagram showing an example of a plurality of planned routes. Although FIG. 7 illustrates three planned routes 15*a* to 15*c*, the number of planned routes is not limited to three. The planned route creating unit 3 creates each of the planned routes 15*a* to 15*c* in the travelable area 12. As in the previous case, t0 is the current time. t1, t2, and t3 are future times. In the example shown in FIG. 7, L0 is the position of the self-driving vehicle A at the current time t0. L1 is the position of the self-driving vehicle A at time t1. L2 is the position of the self-driving vehicle A at time t2. L3 is the position of the self-driving vehicle A at time t3.

Also in the second example, the non-traveling area plan creating unit 4 sets the non-traveling area for each time zone. The non-traveling area plan creating unit 4, when setting the non-traveling area of one time zone, specifies an area surrounded by outermost planned routes in that time zone, a line obtained by connecting the positions on the respective planned routes at the start time of that time zone, and a line obtained by connecting positions on the respective planned routes at the end time of the time zone. Then, the non-traveling area plan creating unit 4 sets an area which is an area other than that area and does not overlap the non-travelable area, as the non-traveling area. This means that it is determined that the self-driving vehicle A (more specifically, the non-traveling area plan creating unit 4) does not travel in an area other than that area. In order to simplify the description, FIG. 7 shows the case where the outermost planned routes are the planned route 15*b* and the planned route 15*c* without change in any time zone. By crossing of the planned routes, the outermost planned route may be replaced.

Figure 8:
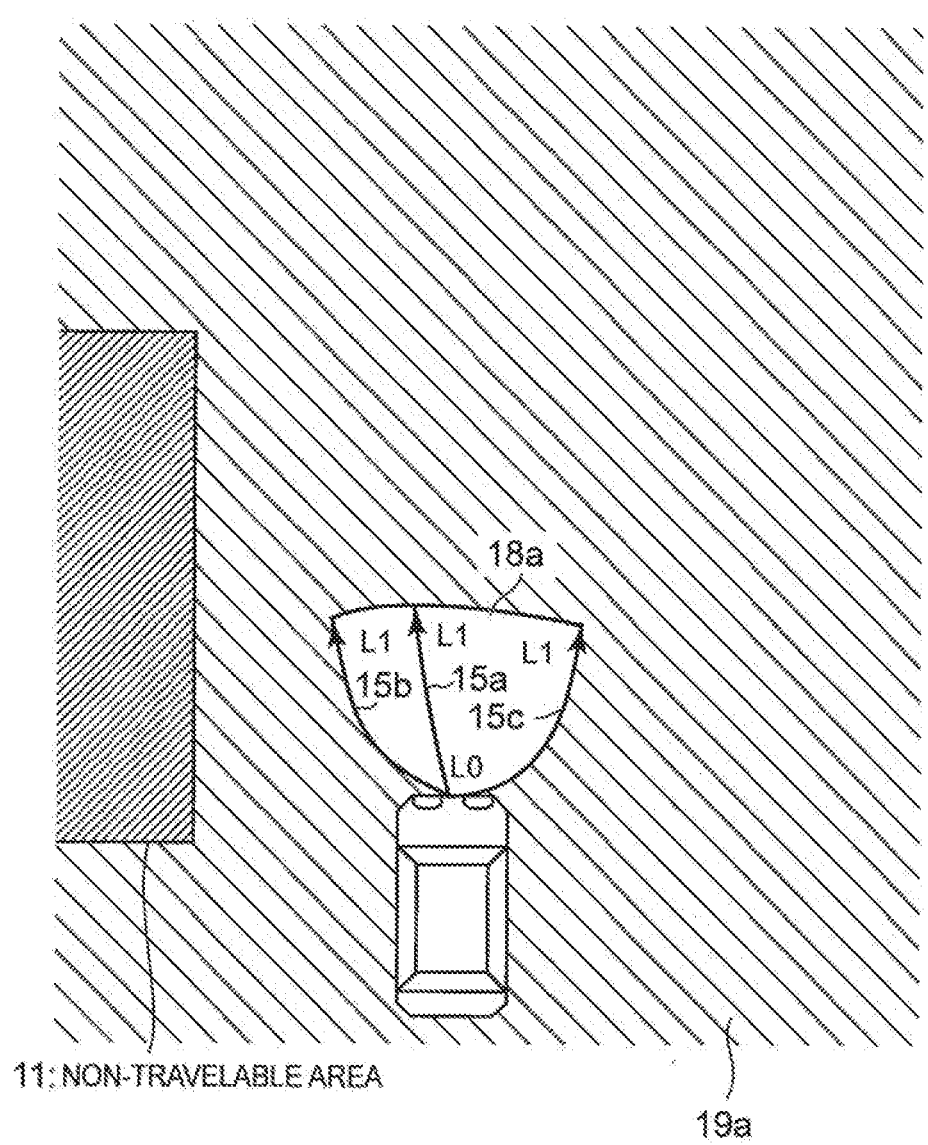
FIG. 8 It depicts a schematic diagram showing a non-traveling area of the self-driving vehicle A in the time zone t0 to t1.

FIG. 8 is a schematic diagram showing the non-traveling area of the self-driving vehicle A in the time zone t0 to t1. The planned routes that are outermost in this time zone are the planned route 15*b* and the planned route 15*c*. Also, the positions on the respective planned routes at time t0 are common. Further, a line obtained by connecting positions on the respective planned routes at time t1 is as shown in FIG. 8. Therefore, an area surrounded by the planned route 15*b*, the planned route 15*c*, the line obtained by connecting the positions on the respective planned routes at time t0 (this line is a point in this example), and the line obtained by connecting the positions on the respective planned routes at time t1 is an area 18*a* shown in FIG. 8. Then, the non-traveling area plan creating unit 4 sets an area 19*a* which is an area other than the area 18*a* and does not overlap the non-travelable area 11, as a non-traveling area in the time zone t0 to t1.

Figure 9:
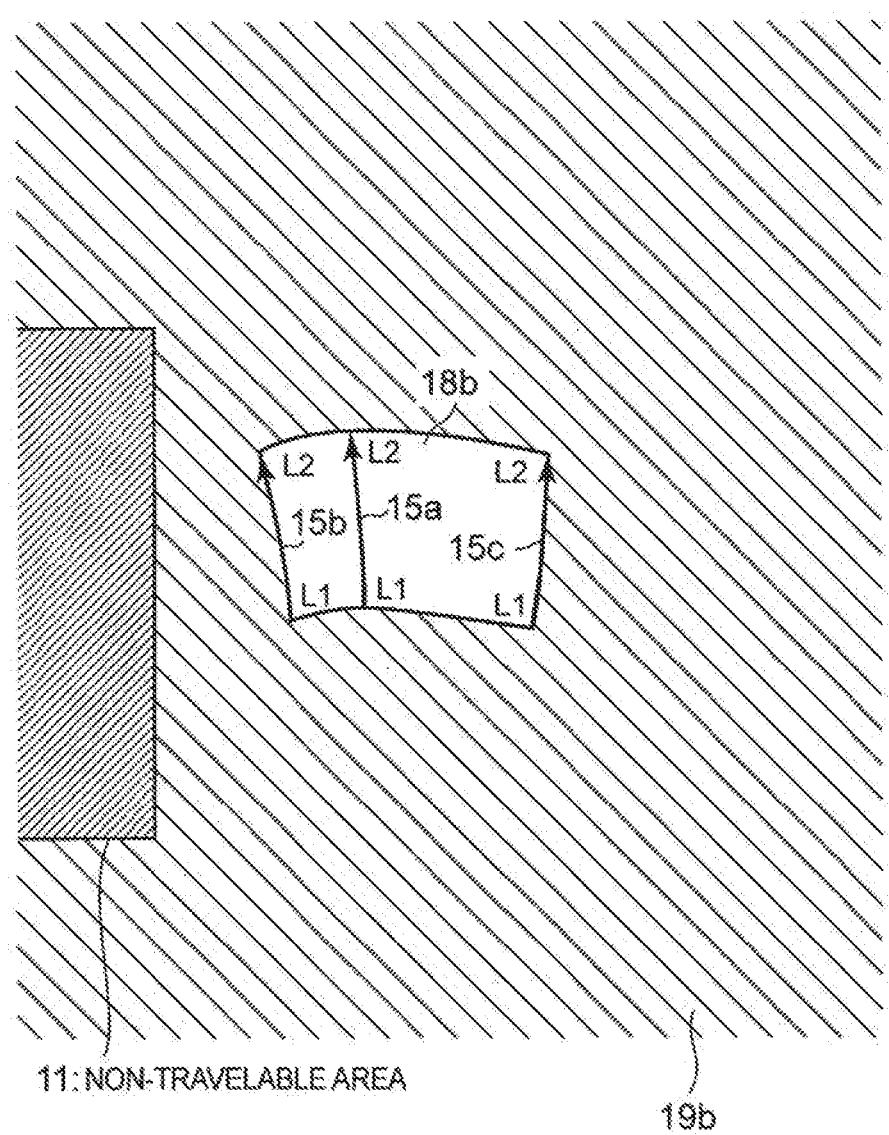
FIG. 9 It depicts a schematic diagram showing a non-traveling area of the self-driving vehicle A in the time zone t1 to t2.

FIG. 9 is a schematic diagram showing a non-traveling area of the self-driving vehicle A in the time zone t1 to t2. The planned routes that are outermost in this time zone are the planned route 15*b* and the planned route 15*c*. Further, a line obtained by connecting the positions on the respective planned routes at time t1 and a line obtained by connecting the positions on the respective planned routes at time t2 are as shown in FIG. 9. Therefore, an area surrounded by the planned route 15*b*, the planned route 15*c*, the line obtained by connecting the positions on the respective planned routes at time t1, and the line obtained by connecting the positions on the respective planned routes at time t2 is an area 18*b* shown in FIG. 9. Then, the non-traveling area plan creating unit 4 sets an area 19*b* which is an area other than the area 18*b* and does not overlap the non-travelable area 11, as the non-traveling area in the time zone t1 to t2.

The non-traveling area plan creating unit 4 similarly sets the non-traveling area of the self-driving vehicle A also for each time zone after time t2. As already described above, the length of the time zone (for example, t0 to t1, etc.) when setting the non-traveling area may be set in advance.

The non-traveling area set for each time zone is the non-traveling area plan. The above is the second example of the creation operation of the non-traveling area plan.

Figure 10:
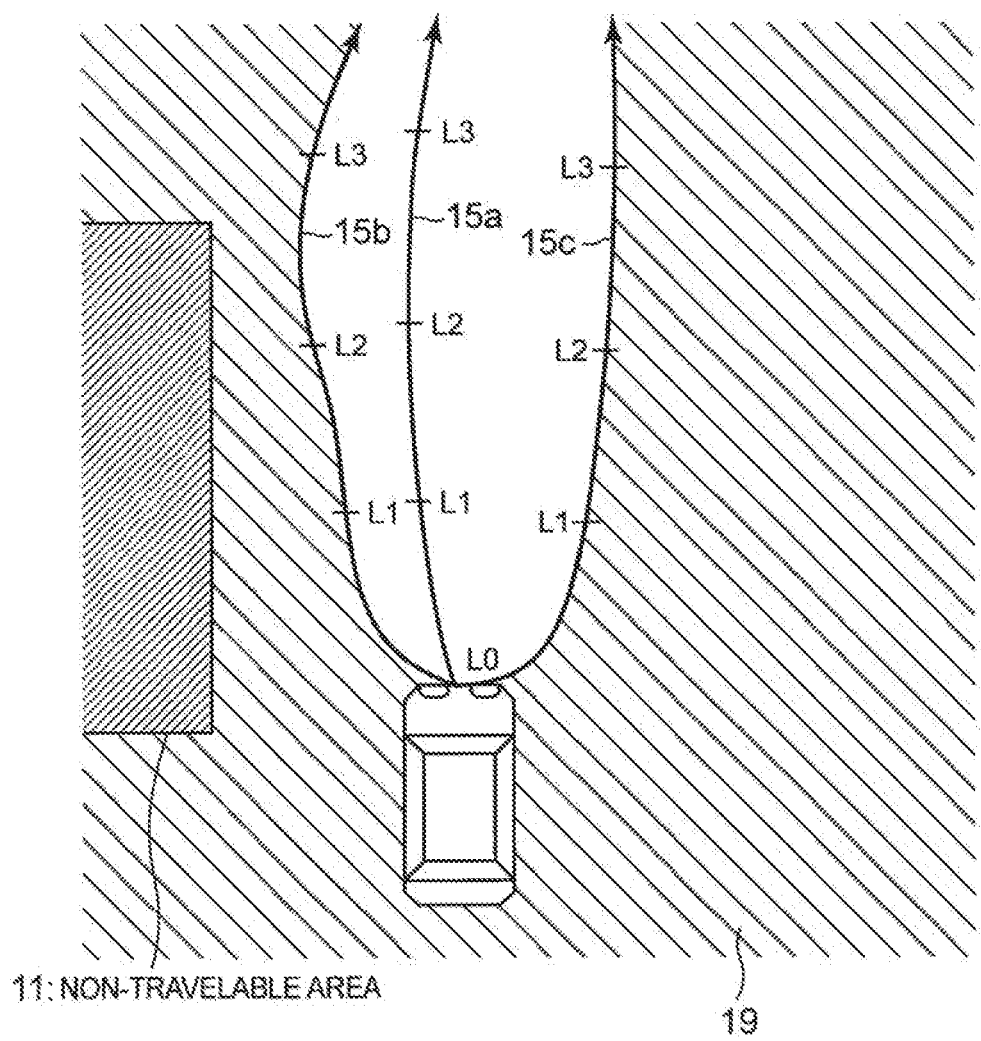
FIG. 10 It depicts a schematic diagram showing an example of a product set of non-traveling areas set for each time zone.

The product set of non-traveling areas set for each time zone as described above can be said to be an area which is an area within the travelable area and is set as an area where the self-driving vehicle does not travel at any time. FIG. 10 shows an example of a product set of non-traveling areas set for each time zone. The area 19 shown in FIG. 10 corresponds to this product set.

It can be said that an area other than the area 19 (an area not indicated by hatching in FIG. 10) in the travelable area 12 is an area which may include a planned route created at a time later than the current time under the same mission. Let m be the current mission. Under mission m, the set of planned routes that can be created at time t is denoted as $P_t(m)$. Also, let the current time be t0. It can be said that the area other than the area 19 in the travelable area 12 includes an area represented as follows.

$$\bigcup_{t \geq t0} P_t(m) \quad [\text{Math. 1}]$$

In the example shown in FIG. 6, the same applies to an area other than the area 17 (an area not hatched in FIG. 6) in the travelable area 12.

The first example and the second example have been described as examples of the creation operation of the non-traveling area plan. The creation operation of the non-traveling area plan is not limited to the above two examples, and the non-traveling area plan creating unit 4 may create the non-traveling area plan by another method.

Figure 11:
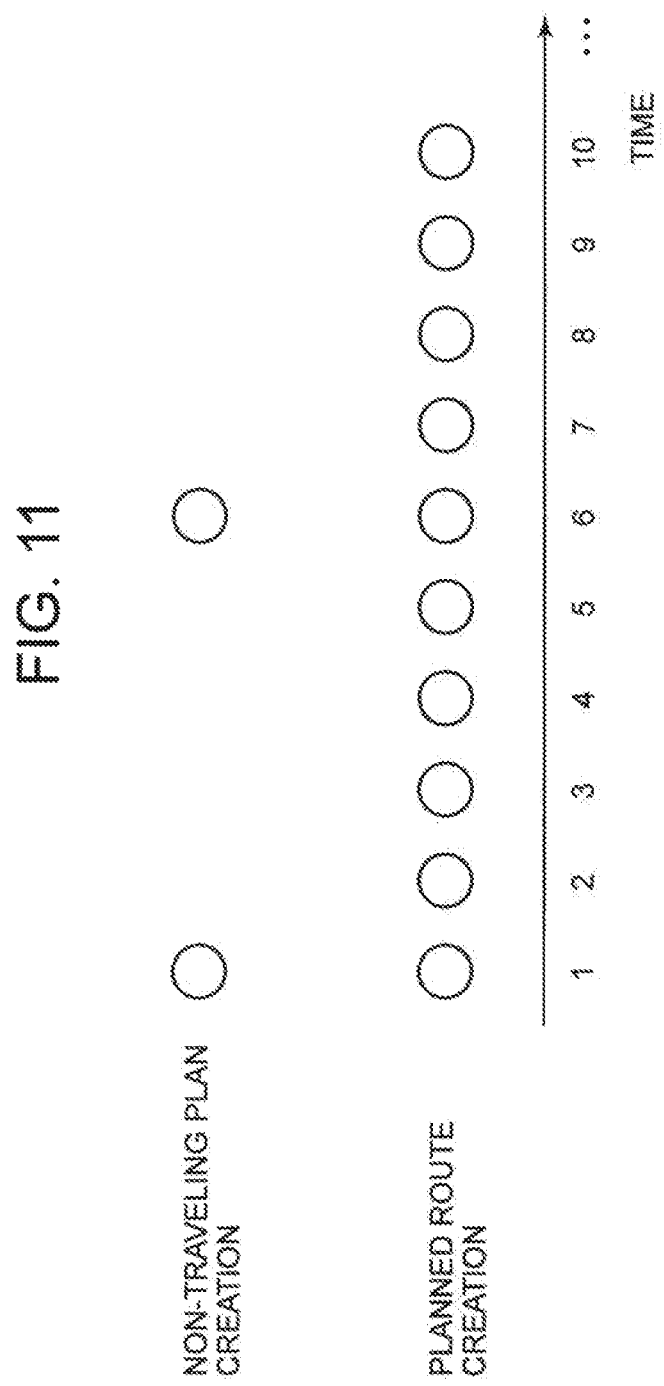
FIG. 11 It depicts a schematic diagram showing a creation frequency of a non-traveling area plan and a creation frequency of a planned route.

The non-traveling area plan creating unit 4 creates a non-traveling area plan at a frequency lower than the frequency at which the planned route creating unit 3 creates a planned route. For example, the planned route creating unit 3 creates a planned route at 25 Hz. In addition, the non-traveling area plan creating unit 4 creates a non-traveling area plan, for example, at 5 Hz. However, the value such as 5 Hz shown here is an example, and it is sufficient if the creation frequency of the non-traveling area plan is lower than the creation frequency of the planned route. FIG. 11 is a schematic diagram showing the creation frequency of the non-traveling area plan and the creation frequency of the planned route. The horizontal axis shown in FIG. 11 represents time. In addition, circular markers shown in FIG. 11 indicate the timing of creating a planned route and the timing of creating a non-traveling area plan. In the present invention, as shown in FIG. 11, the frequency at which the non-traveling area plan creating unit 4 creates the non-traveling area plan is lower than the frequency at which the planned route creating unit 3 creates the planned route.

In the following description, the planned route creating unit 3 creates a planned route at 25 Hz, and the non-traveling area plan creating unit 4 creates a non-traveling area plan at 5 Hz as an example.

The reference area setting unit 5 sets an area which is an area having a width including the planned route created by the planned route creating unit 3 and serves as a determination reference of whether the non-traveling area plan creating unit 4 creates a non-traveling area plan again without depending on the set frequency (in this example, frequency of 5 Hz). Hereinafter, this area is referred to as a reference area. The reference area setting unit 5 sets a reference area when the non-traveling area plan is created.

Figure 12:
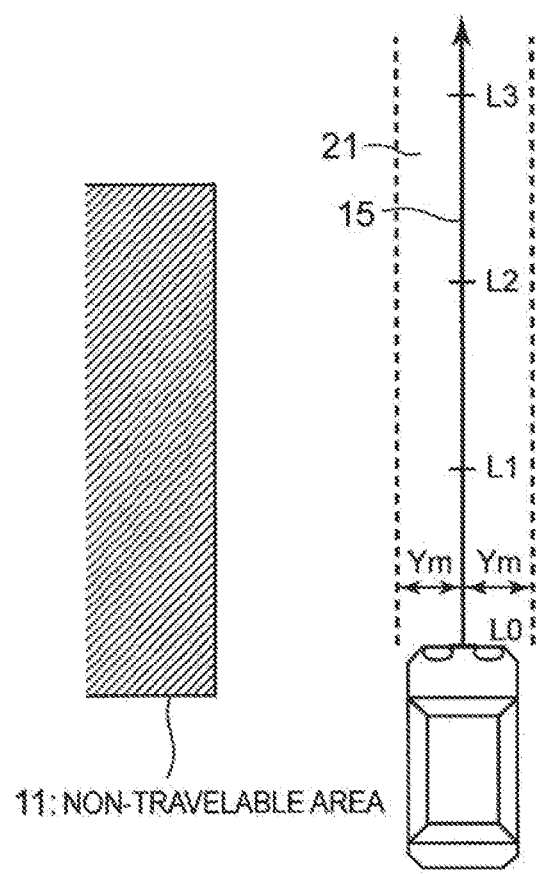
FIG. 12 It depicts a schematic diagram showing an example of a reference area.

When the non-traveling area plan creating unit 4 creates a non-traveling area plan by the method shown in the first example described above, the reference area setting unit 5 sets, as a reference area, an area within Ym on both sides of the planned route (for example, the planned route 15 shown in FIG. 3) used by the non-traveling area plan creating unit 4 for generating the non-traveling area plan. However, Ym is a value smaller than the above-mentioned Xm (refer to FIG. 4 and FIG. 5). FIG. 12 is a schematic diagram showing an example of the reference area. In the example shown in FIG. 12, an area centered on the planned route 15, which is sandwiched by two broken lines, corresponds to a reference area 21.

Figure 13:
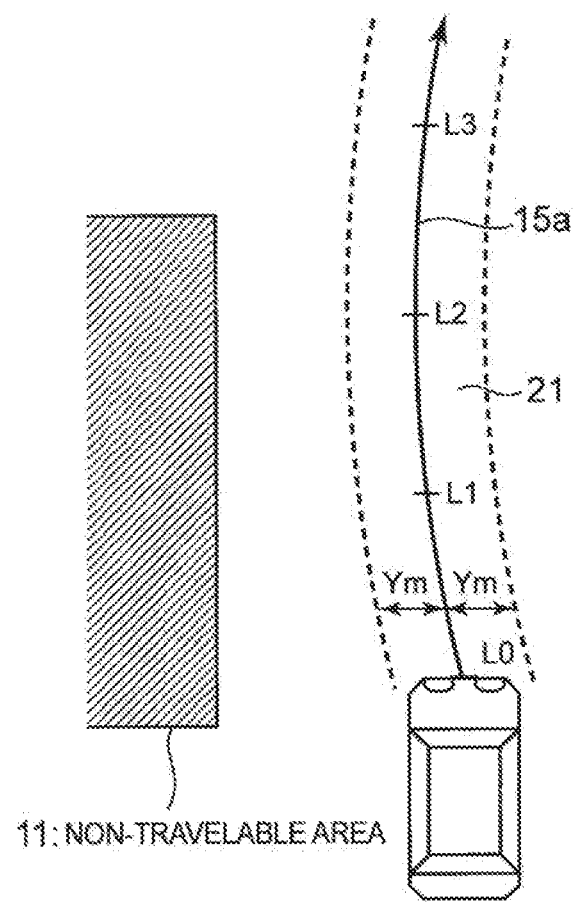
FIG. 13 It depicts a schematic diagram showing another example of the reference area.

Further, when the non-traveling area plan creating unit 4 creates a non-traveling area plan by the method shown in the above-described second example, the planned route creating unit 3 derives a plurality of planned routes in the process of finally setting one planned route and sets, as a final planned route, an optimal planned route from among the plurality of planned routes. The reference area setting unit 5 sets an area within Ym on both sides of the planned route, as a reference area. FIG. 13 is a schematic diagram showing another example of the reference area. It is assumed that the planned route creating unit 3 sets the planned route 15*a* shown in FIG. 7 as the optimal planned route. In this case, the reference area setting unit 5 sets an area within Ym on both sides of the planned route 15*a* as the reference area 21. In the example shown in FIG. 13, an area centered on the planned route 15*a*, which is sandwiched by two broken lines, corresponds to the reference area 21.

When the planned route newly created by the planned route creating unit 3 deviates from the reference area 21, the non-traveling area plan creating unit 4 creates the non-traveling area plan again regardless of the set frequency (frequency of 5 Hz in this example). That is, when the new planned route deviates from the reference area 21, the non-traveling area plan creating unit 4 newly creates the non-traveling area plan even if it is not the set timing. For example, in the example shown in FIG. 11, the non-traveling area plan creating unit 4 creates the non-traveling area plan at times "1" and "6". Then, for example, when the planned route created at time "3" deviates from the reference area 21 set at time "1", the non-traveling area plan creating unit 4 newly creates the non-traveling area plan at that timing. In addition, since the non-traveling area plan is newly created, the reference area setting unit 5 newly sets a reference area.

The transmission unit 6 broadcasts the non-traveling area plan to the self-driving vehicles existing in the vicinity every time the non-traveling area plan creating unit 4 creates the non-traveling area plan. At this time, the transmission unit 6 broadcasts also the identification information of the self-driving vehicle A together with the non-traveling area plan. This is to allow other self-driving vehicles that have received the non-traveling area plan to respond to the self-driving vehicle A. Here, the self-driving vehicle B will be described as an example of another self-driving vehicle existing in the vicinity.

In addition, the transmission unit 6 should just transmit the non-traveling area plan and the identification information of the self-driving vehicle A and does not transmit the planned route.

Further, not only the vehicle control system 1*a* of the self-driving vehicle A but also the vehicle control system 1*b* of the other self-driving vehicle B creates a non-traveling area plan and transmits the non-traveling area plan.

The receiving unit 32 of the self-driving vehicle A receives the non-traveling area plan and the identification information of the self-driving vehicle B broadcasted by the vehicle control system 1*b* of the other self-driving vehicle B.

Figure 14:
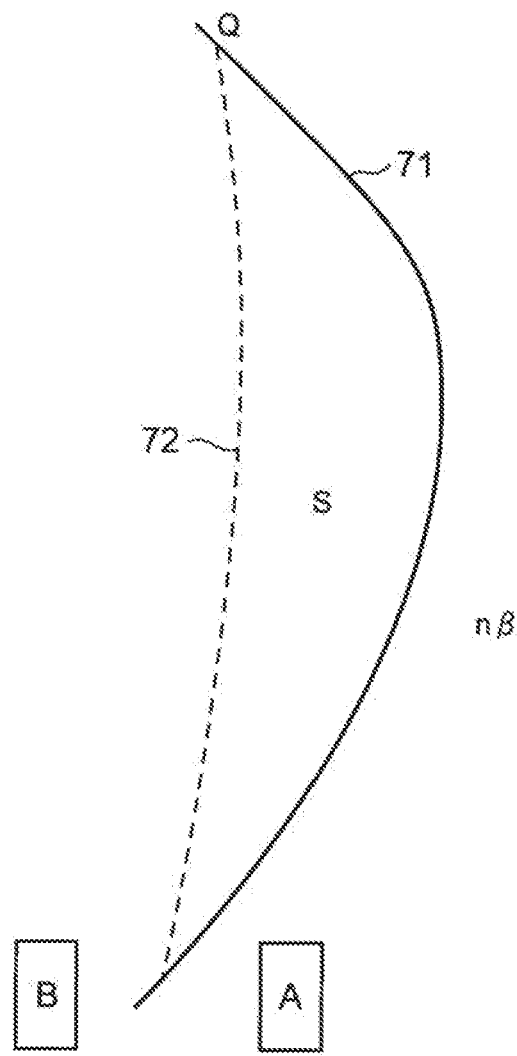
FIG. 14 It depicts a schematic diagram showing an example of a non-traveling area of another self-driving vehicle B.

FIG. 14 is a schematic diagram showing an example of a non-traveling area of another self-driving vehicle B. Hereinafter, the non-traveling area of the self-driving vehicle B is referred to as nβ. In FIG. 14, the area on the right side of a boundary line 71 is assumed to be the non-traveling area nβ of the self-driving vehicle B. Note that FIG. 14 does not show the non-travelable area in order to simplify the description.

The self-driving vehicle A can travel without being affected by the self-driving vehicle B if it travels in the non-traveling area nβ. Therefore, for the self-driving vehicle A, it is more preferable that the non-traveling area nβ be wider. For example, in the example shown in FIG. 14, it is assumed that the self-driving vehicle A sets a point Q as a destination point. In the case of traveling to the point Q without being affected by the self-driving vehicle B, it is necessary to travel on the right side of the boundary line 71, which causes a detour. If the boundary line 71 is closer to the left than in the case shown in FIG. 14, the non-traveling area nβ is widened, and the self-driving vehicle A can travel to the point Q without detouring.

The negotiation area determining unit 36 of the self-driving vehicle A specifies one or more negotiation areas each of which is a subject of negotiation to be included in the non-traveling area of the self-driving vehicle B from the area other than the non-traveling area nβ of the other self-driving vehicle B. In FIG. 14, an area S surrounded by the boundary line 71 and a line 72 is illustrated as an example of the negotiation area. Assuming that the non-traveling area of the self-driving vehicle B is changed so that the area S is included in the non-traveling area nβ of the self-driving vehicle B, the non-traveling area after the change can be expressed as nβ∪S by using the non-traveling area nβ and the area S before the change.

Although only one area S is shown as the negotiation area in FIG. 14, the negotiation area determining unit 36 specifies one or more negotiation areas from the areas other than the non-traveling area nβ of the other self-driving vehicle B. The number of negotiation areas specified at this time may be one or more. In addition, the negotiation areas may overlap. For example, the negotiation area determining unit 36 may specify a wider negotiation area including the negotiation area S separately from the negotiation area S. Also, for example, the negotiation area determining unit 36 may specify a narrower negotiation area included in the negotiation area S separately from the negotiation area S. The manner in which the negotiation area determining unit 36 specifies the negotiation area is not particularly limited.

The negotiation area determining unit 36 of the self-driving vehicle A calculates the value of the specified negotiation area for the self-driving vehicle A for each specified negotiation area. Hereinafter, with respect to the negotiation area specified by the negotiation area determining unit 36, the value calculated by the negotiation area determining unit 36 is described as a second value in distinction from a first value described later. The first value will be described later.

Furthermore, the negotiation area determining unit 36 determines one or more negotiation areas to be provided in notification to the self-driving vehicle B that is the transmission source of the non-traveling area plan, based on the second value calculated for each specified negotiation area. For example, the negotiation area determining unit 36 determines the top predetermined number of negotiation areas as the negotiation areas to be provided in notification to the self-driving vehicle B in descending order of the second value. However, the number of negotiation areas to be provided in notification to the self-driving vehicle B may be one. Hereinafter, in order to simplify the description, the case where the negotiation area determining unit 36 determines the top three negotiation areas as the negotiation areas to be provided in notification to the self-driving vehicle B in descending order of the second value is taken as an example.

The method of calculating the second value will be described below. The destination point of the self-driving vehicle A is represented by a symbol g. Also, a planned route to the destination point g is represented by a symbol p. There may be a plurality of planned routes p. The cost when the destination point g and the planned route p are set will be expressed as cost(p, g). The cost is a cost generated by traveling along the planned route p. For example, the cost may be expressed based on fuel consumption, may be expressed based on the path, or may be expressed based on the time taken to the destination. The cost is preferably small. Hereinafter, when the destination point g is fixed in a certain area, a planned route which minimizes the cost is denoted as p*. The cost can be calculated, for example, using an algorithm such as RRT or A*.

In addition, it is assumed that the area is indicated by Γ. An optimization problem for setting a planned route that minimizes the cost within the area Γ can be written as follows.

$$\min_{p} \mathrm{cost}(p, g) \quad \text{[Math. 2]}$$
$$\text{s.t.} \ p \leq \Gamma$$

In this optimization problem, the planned route set to minimize the cost is p*. Therefore, the minimum cost among the costs according to the various planned routes set within a given area Γ is cost(p*, g). Hereinafter, this minimum cost when the area Γ is designated is referred to as mincost(Γ). That is, mincost(Γ)=cost(p*,g).

Figure 15:
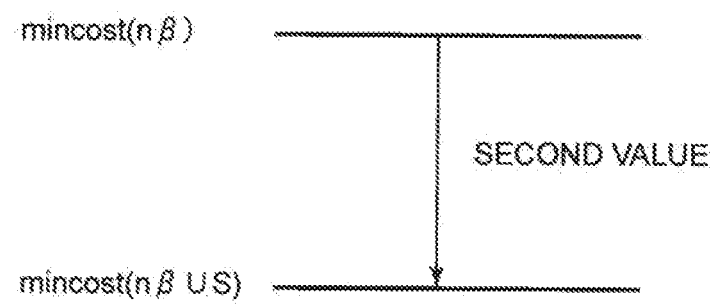
FIG. 15 It depicts a schematic diagram showing a change in the minimum cost of the self-driving vehicle A when a non-traveling area of the self-driving vehicle B is changed so that an area S is included in a non-traveling area nβ of the self-driving vehicle B.

FIG. 15 is a schematic diagram showing a change in the minimum cost of the self-driving vehicle A when the non-traveling area of the self-driving vehicle B is changed so that the area S is included in the non-traveling area nβ of the self-driving vehicle B. The minimum cost of the self-driving vehicle A corresponding to the non-traveling area nβ is mincost(nβ). In addition, assuming that the non-traveling area of the self-driving vehicle B is updated so as to include the area S in the non-traveling area of the self-driving vehicle B, the minimum cost of the self-driving vehicle A is mincost(nβ∪S). By including the area S in the non-traveling area, the minimum cost of the self-driving vehicle A is reduced. It can be said that this minimum cost reduction amount is the value (second value) of the area S for the self-driving vehicle A.

Therefore, the negotiation area determining unit 36 of the self-driving vehicle A calculates the second value of the area S by the following equation (1).

$$f_A(S) = \mathrm{mincost}(n\beta) - \mathrm{mincost}(n\beta \cup S) \quad (1)$$

$f_A(S)$ is the value (second value) of the area S for the self-driving vehicle A.

That is, the negotiation area determining unit 36, when calculating the second value of one negotiation area, calculates the value (second value) of the area S by calculating the difference between the minimum cost (mincost(nβ)) of the planned route created in the non-traveling area nβ of the other self-driving vehicle B and the minimum cost (mincost (nβ∪S)) of the planned route created in the combined area of the non-traveling area nβ of the self-driving vehicle B and the negotiation area S.

The negotiation area determining unit 36 calculates a second value for each of the specified negotiation areas. Then, in this example, the negotiation area determining unit 36 determines the top three negotiation areas as the negotiation areas to be provided in notification to the self-driving vehicle B in descending order of the second value. That is, in the present example, the negotiation area determining unit 36 determines three negotiation areas.

The negotiation area information transmission unit 33 transmits information on the negotiation area determined as the negotiation area to be provided in notification to the self-driving vehicle B to the self-driving vehicle B. Note that, when the negotiation area determining unit 36 has determined one negotiation area, the negotiation area information transmission unit 33 may transmit the information on the one negotiation area to the self-driving vehicle B.

As described above, when the non-traveling area plan is received from the other self-driving vehicle B, the vehicle control system 1 of the self-driving vehicle A transmits information on the negotiation area to the self-running vehicle B as a response.

Similarly, when the non-traveling area plan is received from the self-driving vehicle A, the vehicle control system 1 of the self-driving vehicle B also transmits the information on the negotiation area determined by the self-driving vehicle B to the self-driving vehicle A as a response.

The negotiation area information receiving unit 9 of the self-driving vehicle A receives the information on the negotiation area transmitted by the other self-driving vehicle B as described above. More specifically, when the transmission unit 6 of the self-driving vehicle A transmits the non-traveling area plan of the self-driving vehicle A and the other self-driving vehicle B having received the non-traveling area plan transmits the information on the negotiation area as a response, the negotiation area information receiving unit 9 of the self-driving vehicle A receives the information on the negotiation area. This negotiation area includes one or more negotiation areas determined by the negotiation area determining unit 36 of the self-driving vehicle B.

The permissible area determining unit 35 of the self-driving vehicle A calculates, for each negotiation area, the value of the negotiation area indicated by the information received from the other self-driving vehicle B by the negotiation area information receiving unit 9. Thus, the value determined by the permissible area determining unit 35 is described as the first value for the negotiation area determined by the other self-driving vehicle.

The permissible area determining unit 35 determines one negotiation area permissible to be included in the non-traveling area, based on the first value calculated for each negotiation area. However, the permissible area determining unit 35 may determine not to include any negotiation area in the non-traveling area.

If it is determined to include the negotiation area whose first value is k in the non-traveling area, the non-traveling area widens (in other words, for the self-driving vehicle A, the area which includes the planned route narrows). Therefore, including the negotiation area whose first value is k in the non-traveling area means that the value is reduced by k for the self-driving vehicle A.

The permissible area determining unit 35 determines whether the minimum value of the first value calculated for each negotiation area is equal to or less than a predetermined threshold value. When the minimum value of the first value calculated for each negotiation area is equal to or less than the predetermined threshold value, the permissible area determining unit 35 determines the negotiation area corresponding to the minimum value as a negotiation area permissible to be included in the non-traveling area.

Further, it is assumed that the minimum value of the first value calculated for each negotiation area is larger than a predetermined threshold value. This means that inclusion of the negotiation area corresponding to the minimum value in the non-traveling area causes a reduction in value equal to or more than a threshold value for the self-driving vehicle A. Therefore, when the minimum value of the first value calculated for each negotiation area is larger than a predetermined threshold value, the permissible area determining unit 35 determines not to include any negotiation area in the non-traveling area.

Figure 16:
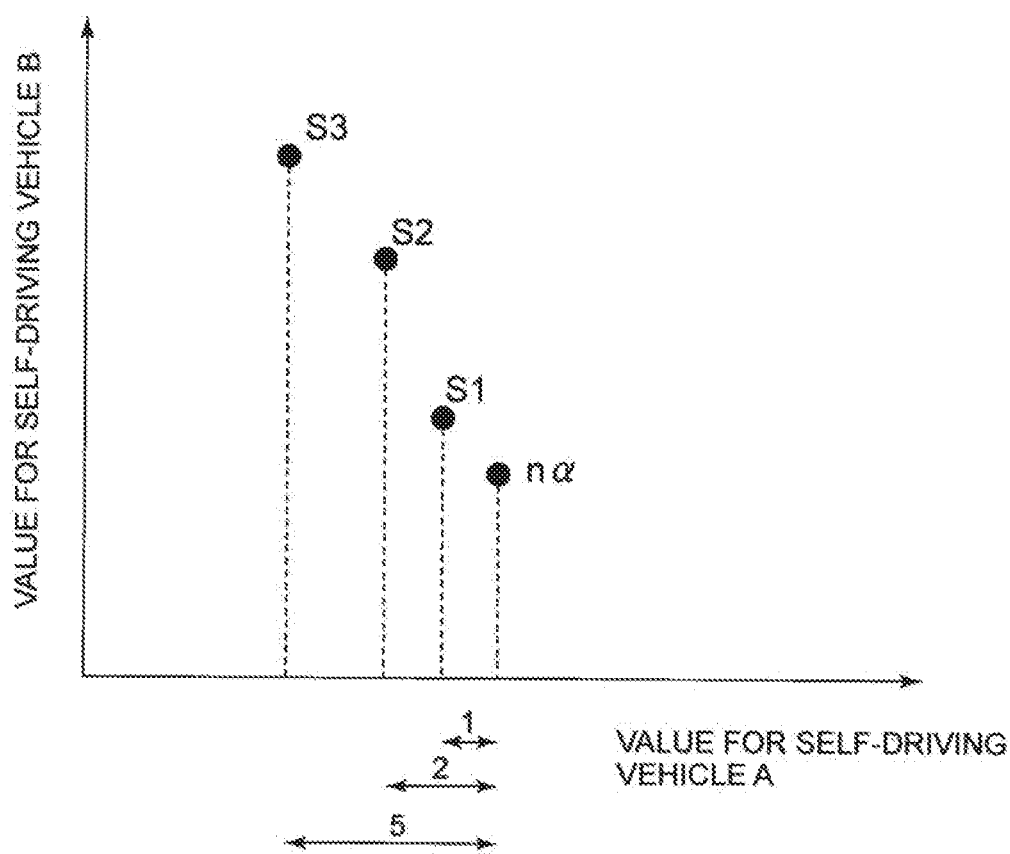
FIG. 16 It depicts a schematic diagram showing values for the self-driving vehicles A and B.

Hereinafter, the non-traveling area of the self-driving vehicle A indicated by the non-traveling area plan transmitted by the transmission unit 6 will be denoted as nα. Further, it is assumed that as a response to the non-traveling area plan transmitted by the transmission unit 6, the self-driving vehicle B has transmitted information on the three negotiation areas S1, S2, and S3 to the self-driving vehicle A. FIG. 16 is a schematic diagram showing the value for the self-driving vehicles A and B. The vertical axis shown in FIG. 16 represents the value for the self-driving vehicle B. The horizontal axis represents the value for the self-driving vehicle A.

For the self-driving vehicle B, the value is higher in the order of the negotiation areas S3, S2, and S1.

It is assumed that the first values of the negotiation areas S3, S2, and S1 are "5", "2", and "1" respectively, for the self-driving vehicle A. Then, inclusion of the negotiation area S3 in the non-traveling area nα reduces the value for the self-driving vehicle A by five. Similarly, inclusion of the negotiation area S2 in the non-traveling area nα reduces the value for the self-driving vehicle A by two. Inclusion of the negotiation area S1 in the non-traveling area nα reduces the value for the self-driving vehicle A by one. Therefore, for the self-driving vehicle A, when the negotiation area S1 is included in the non-traveling area nα, the amount of value reduction is the smallest.

In this example, the threshold value is set to 3. The minimum value of the first values of the negotiation areas S1 to S3 is 1, and the value 1 is equal to or less than the threshold value 3. Therefore, the permissible area determining unit 35 determines to include the negotiation area S1 whose first value is the smallest in the non-traveling area nα.

One negotiation area is determined by the permissible area determining unit 35 as an area to be included in the non-traveling area nα.

On the other hand, there may be a case where a negotiation area whose first value is the minimum value exists in plural. For example, in the example shown in FIG. 16, if the first value of the negotiation area S2 is 1, there are two negotiation areas whose first values are the smallest. In this case, the permissible area determining unit 35 determines any one of the negotiation areas S1 and S2 as an area to be included in the non-traveling area nα. In addition, the negotiation area information transmission unit 33 of the self-driving vehicle B may transmit, together with the negotiation areas S1 to S3, the values of these negotiation areas for the self-driving vehicle B to the self-driving vehicle A. In this case, the permissible area determining unit 35, when selecting one of the negotiation areas S1 and S2, may select the negotiation area S2 having a higher value for the self-driving vehicle B.

Next, an operation performed by the permissible area determining unit 35 of the self-driving vehicle A for determining the value (first value) of the negotiation area determined by the self-driving vehicle B will be described using a specific example.

When the permissible area determining unit 35 of the self-driving vehicle A calculates a first process of one negotiation area, the permissible area determining unit 35 performs the following calculation. The permissible area determining unit 35 calculates the first value of the negotiation area by calculating a difference between the minimum cost of the planned route created in the area (hereinafter referred to as α') excluding the non-traveling area nα of the self-driving vehicle A and the negotiation area from the travelable area of the self-driving vehicle A and the minimum cost of the planned route created in the area excluding the non-traveling area nα of the self-driving vehicle A from the travelable area of the self-driving vehicle A. When the negotiation area is S, an area obtained by excluding the non-traveling area nα of the self-driving vehicle A from the travelable area of the self-driving vehicle A can be expressed as α'∪S. Therefore, when the negotiation area is S, the permissible area determining unit 35 calculates the first value of the negotiation area S according to the following equation (2).

$$F_A(S) = \text{mincost}(\alpha') - \text{mincost}(\alpha' \cup S) \quad (2)$$

$F_A(S)$ is the first value of the negotiation area S for the self-driving vehicle A. When α' and α'∪S are compared, α' is narrower and the minimum cost for the self-driving vehicle A is larger. Equation (2) represents calculating the first value of the negotiation area S by calculating the reduction amount (difference) in the minimum cost by adding S to α' from the minimum cost (mincost(α')).

Figure 17:
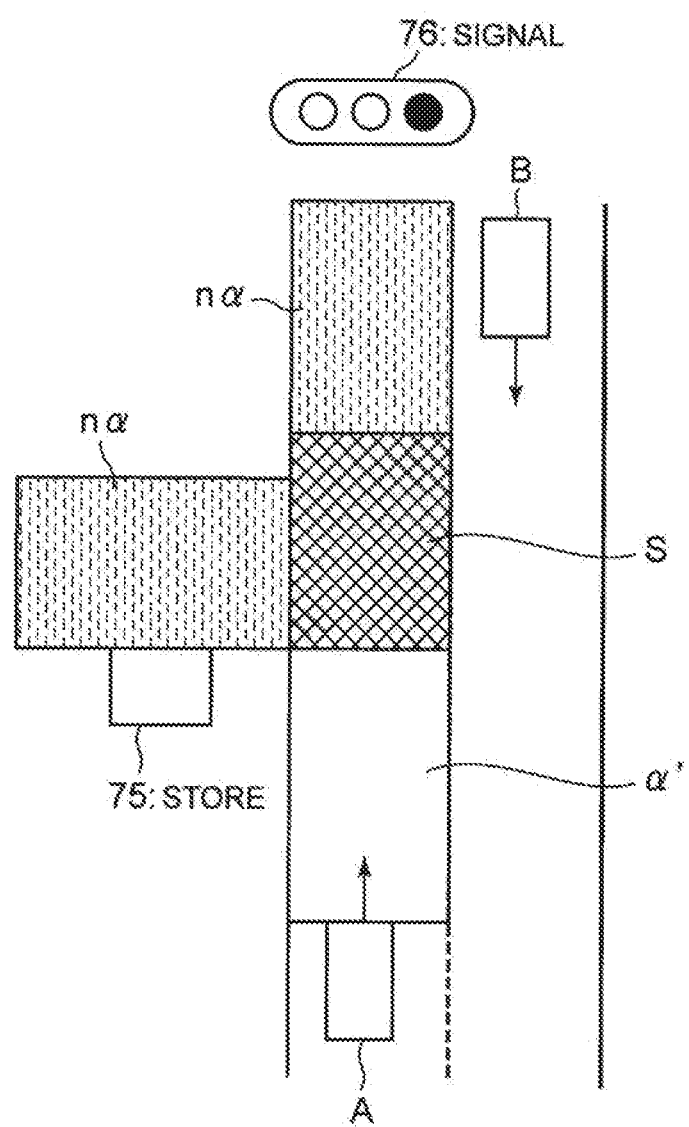
FIG. 17 It depicts an explanatory diagram for schematically describing one negotiation area and calculation of a first value of the negotiation area.

FIG. 17 is an explanatory diagram for schematically describing one negotiation area and calculation of the first value of the negotiation area. In FIG. 17, a T-junction and two self-driving vehicles A and B are depicted. In the example shown in FIG. 17, the self-driving vehicles A and B travel in opposite directions to each other on a straight road (a road with a large width). Further, the self-driving vehicle A goes straight without turning left. The self-driving vehicle B is aiming to turn right, with a store 75 located along the road of a dead-end road (road with a small width) as the destination point. A signal 76 in the traveling direction of the self-driving vehicle A is in the state of a red light, and the vehicle control system 1a of the self-driving vehicle A sets an area near the signal 76 and an area of the road on the left side as viewed from the self-driving vehicle A as the non-traveling area nα, and transmits the non-traveling area plan to the self-driving vehicle B. Furthermore, it is assumed that the vehicle control system 1b of the self-driving vehicle B, since the value of the area S (see FIG. 17) is high to turn right, has transmitted the area S to the vehicle control system 1a as one of the negotiation areas.

Here, the case where the permissible area determining unit 35 of the self-driving vehicle A calculates the first value of the area S will be described as an example. In the example shown in FIG. 17, an area obtained by excluding the non-traveling area nα of the self-driving vehicle A and the negotiation area S from the travelable area of the self-driving vehicle A is the area α' shown in FIG. 17. Further, an area obtained by excluding the non-traveling area nα of the self-driving vehicle A from the travelable area of the self-driving vehicle A is an area obtained by combining the area α' and the negotiation area S shown in FIG. 17. Therefore, the area obtained by excluding the non-traveling area nα of the self-driving vehicle A from the travelable area of the self-driving vehicle A is α'∪S. Then, the permissible area determining unit 35 calculates the first value $F_A(S)$ of the negotiation area by performing calculation of Equation (2) above.

The permissible area determining unit 35 similarly calculates the first value also for other negotiation areas (not shown in FIG. 17) provided in notification from the self-driving vehicle B.

Then, as described above, the permissible area determining unit 35 determines whether the minimum value of the first value calculated for each negotiation area is equal to or less than a predetermined threshold value. When the minimum value of the first value calculated for each negotiation area is equal to or less than the predetermined threshold value, the permissible area determining unit 35 determines the negotiation area corresponding to the minimum value as a negotiation area permissible to be included in the non-traveling area. If the first value of the area S is the smallest among the first values of the negotiation areas and is equal to or less than the threshold value, the permissible area determining unit 35 determines the negotiation area S as a negotiation area permissible to include the negotiation area S in the non-traveling area. In the example shown in FIG. 17, the signal 76 is a red light and it is impossible to pass the signal 76 immediately, and it is considered that the first value of the negotiation area S is low for the self-driving vehicle A. Therefore, it is considered that the negotiation area S is likely to be determined as a negotiation area that allows inclusion in the non-traveling area.

The non-traveling area plan creating unit 4, when the permissible area determining unit 35 has determined one negotiation area permissible to be included in the non-traveling area, creates a new non-traveling area plan in which the negotiation area is included in the non-traveling area. For example, in the example shown in FIG. 17, it is assumed that the permissible area determining unit 35 has determined the negotiation area S as a negotiation area permissible to be included in the non-traveling area nα. In this case, the non-traveling area plan creating unit 4 creates a new non-traveling area plan in which the negotiation area S is included in the non-traveling area nα. Then, the transmission unit 6 transmits the new non-traveling area plan to the self-driving vehicle B.

Further, when the minimum value of the first value calculated for each negotiation area is larger than a predetermined threshold value, the permissible area determining unit 35 determines not to include any negotiation area in the non-traveling area. In this case, the transmission unit 6 transmits, to the self-driving vehicle B, the determination not to include any negotiation area provided in notification from the self-driving vehicle B in the non-traveling area.

The planned route creating unit 3, the non-traveling area plan creating unit 4, the reference area setting unit 5, the transmission unit 6 (excluding hardware for communication), the negotiation area information receiving unit 9 (excluding hardware for communication), the permissible area determining unit 35, the receiving unit 32 (excluding hardware for communication), the negotiation area determining unit 36, and the negotiation area information transmission unit 33 (excluding hardware for communication) are realized, for example, by a computer operating according to a vehicle control program. This computer is provided to the self-driving vehicle A. In this case, the computer reads a vehicle control program from a program recording medium such as a program storage device included in the computer, and may operate, according to the vehicle control program, as the planned route creating unit 3, the non-traveling area plan creating unit 4, the reference area setting unit 5, the transmission unit 6, the negotiation area information receiving unit 9, the permissible area determining unit 35, the receiving unit 32, the negotiation area determining unit 36, and the negotiation area information transmission unit 33. Note that hardware for communication (communication interface) is connected to the computer.

The vehicle control system 1 also includes a traveling control unit (not shown) that controls the self-driving vehicle A so as to cause the self-driving vehicle A to travel along the planned route created by the planned route creating unit 3. The traveling control unit and the portion for executing the mission control are also realized, for example, by the above-described computer that operates according to the vehicle control program.

Figure 18:
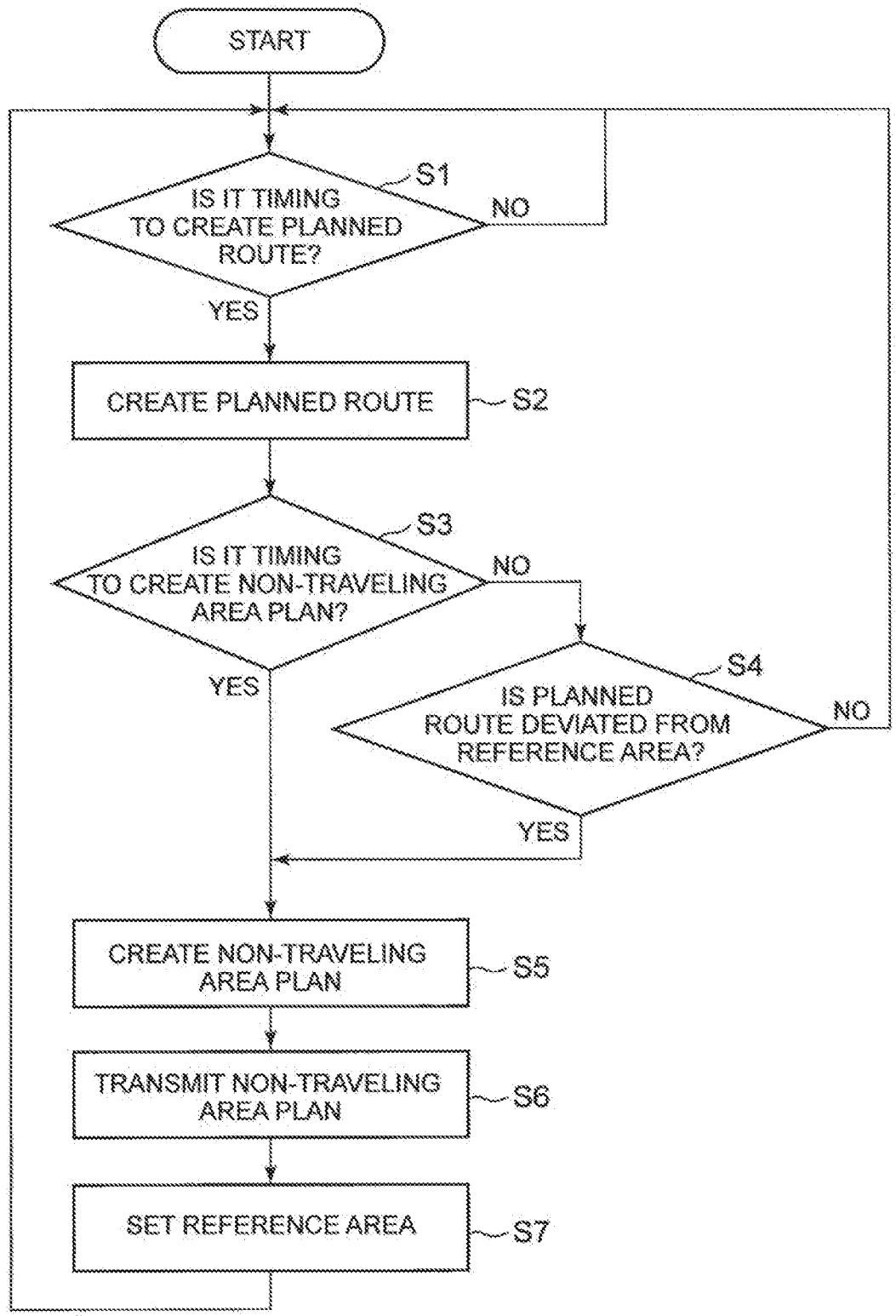
FIG. 18 It depicts a flowchart showing an example of a processing progress when creating a non-traveling area plan.

Next, the processing progress of the present invention will be described. FIG. 18 is a flowchart showing an example of a processing progress when creating the non-traveling area plan. In addition, since the operation of each element of the vehicle control system 1 is already described, the detailed description of the operation is omitted here. Further, steps S1 to S7 shown in FIG. 18 are repetitive processing, and the description will be provided assuming that the reference area is set in step S7 executed most recently.

The planned route creating unit 3 determines whether it is timing to create the planned route (step S1). If it is not the timing to create the planned route (No in step S1), the planned route creating unit 3 waits until the creation timing of the planned route.

When it is the timing to create a planned route (Yes in step S1), the planned route creating unit 3 creates the planned route (step S2).

Next, the non-traveling area plan creating unit 4 determines whether it is timing to create the non-traveling area plan (step S3). If it is the timing to create the non-traveling area plan (Yes in step S3), the process proceeds to step S5.

If it is not the timing to create the non-traveling area plan (No in step S3), the non-traveling area plan creating unit 4 determines whether the planned route created in step S2 is deviated from the reference area already set (step S4). If the planned route is deviated from the reference area (Yes in step S4), the process proceeds to step S5. If the planned route is not deviated from the reference area (No in step S4), the process returns to step S1.

When the process proceeds to step S5 from step S3 or step S4, the non-traveling area plan creating unit 4 creates a non-traveling area plan (step S5). The non-traveling area plan creating unit 4 may create the non-traveling area plan on the basis of the planned route created in the latest step S2. Alternatively, the non-traveling area plan creating unit 4 may create the non-traveling area plan on the basis of a plurality of planned routes obtained in the process of setting the final planned route in the latest step S2.

Next, the transmission unit 6 broadcasts the non-traveling area plan (the non-traveling area for each time zone) created in step S5 and information including the self-driving vehicle A to self-driving vehicles in the vicinity (step S6).

Next, the reference area setting unit 5 sets a reference area on the basis of the planned route created in the latest step S2 (step S7). After step S7, the process returns to step S1.

Figure 19:
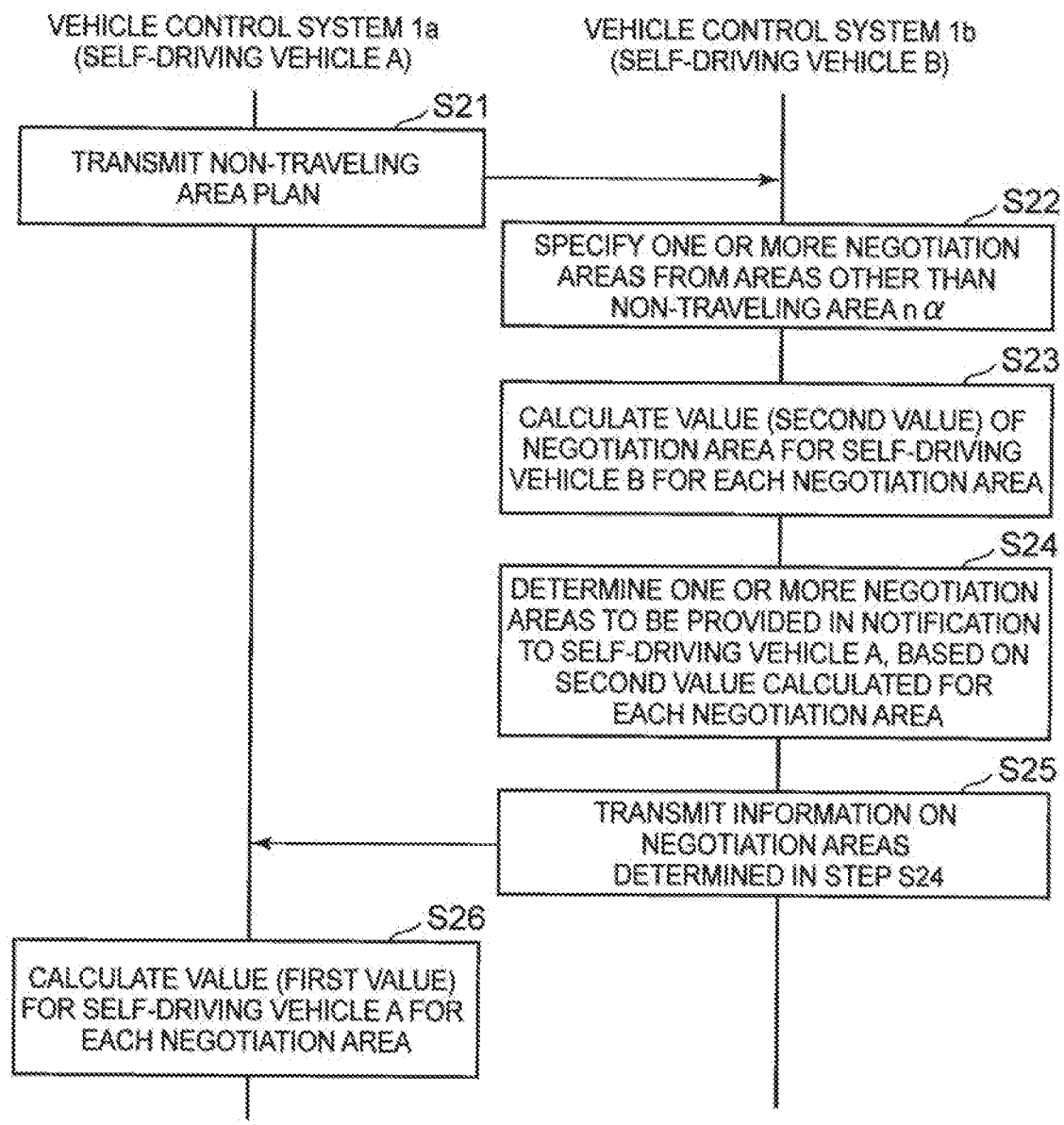
FIG. 19 It depicts a sequence diagram showing an example of a processing progress when transmitting and receiving a non-traveling area plan and a negotiation area.
Figure 20:
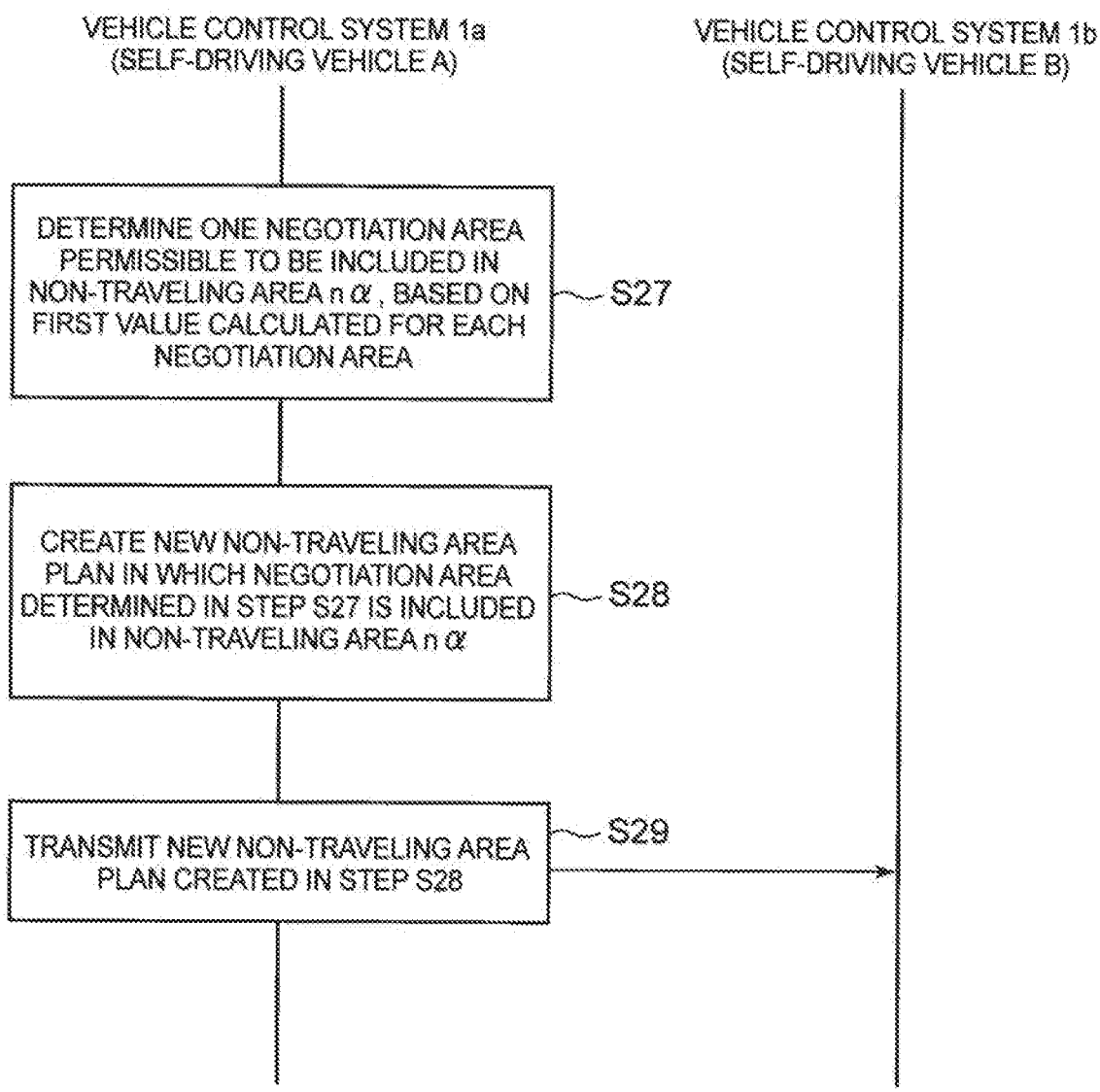
FIG. 20 It depicts a sequence diagram showing an example of a processing progress when transmitting and receiving a non-traveling area plan and a negotiation area.

Next, an example of a processing progress in the case of transmitting and receiving a non-traveling area plan and a negotiation area by inter-vehicle communication will be described. FIG. 19 and FIG. 20 are sequence diagrams showing an example of the processing progress in the case of transmitting and receiving a non-traveling area plan and a negotiation area. In the following description, the case where the self-driving vehicle A (vehicle control system 1*a*) transmits the non-traveling area plan of the self-driving vehicle A to the self-driving vehicle B (vehicle control system 1*b*) will be described as an example. The vehicle control systems 1*a* and 1*b* both have the same configuration (see FIG. 1). As described above, the operation of each element of the vehicle control system 1 has already been described, so a detailed description of the operation will be omitted here.

Note that, it is assumed that the non-traveling area plan creating unit 4 of the vehicle control system 1*a* has already created the non-traveling area plan of the self-driving vehicle A. Further, the non-traveling area of the self-driving vehicle A is denoted as nα.

The transmission unit 6*a* of the self-driving vehicle A broadcasts the non-traveling area plan and the identification information of the self-driving vehicle A to other self-driving vehicles existing in the vicinity (step S21).

The receiving unit 32*b* of the vehicle control system 1*b* receives the non-traveling area plan of the self-driving vehicle A and the identification information of the self-driving vehicle A transmitted in step S21.

The negotiation area determining unit 36*b* of the vehicle control system 1*b* specifies one or more negotiation areas from an area other than the non-traveling area nα indicated by the non-traveling area plan (step S22).

Next, the negotiation area determining unit 36*b* calculates the value (second value) of the negotiation area for the self-driving vehicle B for each negotiation area specified in step S22 (step S23). Let S be the negotiation area of interest. In addition, the second value of the negotiation area S for the self-driving vehicle B is $f_B(S)$. The negotiation area determining unit 36*b* may calculate the second value by the following equation (3) for each negotiation area.

$$f_B(S) = \mathrm{mincost}(n\alpha) - \mathrm{mincost}(n\alpha \cup S) \qquad (3)$$

Next, the negotiation area determining unit 36*b* determines one or more negotiation areas to be provided in notification to the self-driving vehicle A, based on the second value calculated for each negotiation area (step S24). For example, the negotiation area determining unit 36*b* determines the top predetermined number of negotiation areas as the negotiation areas to be provided in notification to the self-driving vehicle A in descending order of the second value.

Next, the negotiation area information transmission unit 33*b* transmits information on the negotiation areas determined in step S24 to the self-driving vehicle A by the unicast method as a response to the non-traveling plan (step S25).

The negotiation area information receiving unit 9 of the self-driving vehicle A receives the information on the negotiation area transmitted in step S25.

Then, the permissible area determining unit 35*a* of the self-driving vehicle A calculates a value (first value) for the self-driving vehicle A for each negotiation area indicated by the information received from the vehicle control system 1*b* (step S26). The permissible area determining unit 35*a* may calculate the first value by performing the calculation of the above-mentioned equation (2) for each negotiation area.

Next, based on the first value calculated for each negotiation area, the permissible area determining unit 35*a* determines one negotiation area permissible to be included in the non-traveling area nα (step S27). In step S27, the permissible area determining unit 35*a* determines whether the minimum value of the first value calculated for each negotiation area is equal to or less than a predetermined threshold value. When the minimum value of the first value calculated for each negotiation area is equal to or less than the predetermined threshold value, the permissible area determining unit 35*a* determines the negotiation area corresponding to the minimum value as a negotiation area permissible to be included in the non-traveling area.

In this case, the non-traveling area plan creating unit 4*a* creates a new non-traveling area plan in which the negotiation area determined in step S27 is included in the non-traveling area nα (step S28). Then, the transmission unit 6*a* transmits the non-traveling area plan to the self-driving vehicle B (step S29). Thereafter, the same sequence as described above may be repeated.

Note that, in step S27, when the minimum value of the first value calculated for each negotiation area is larger than the predetermined threshold value, the permissible area determining unit 35 determines not to include any negotiation area in the non-traveling area. In this case, the transmission unit 6*a* transmits, to the self-driving vehicle B, information indicating the determination not to include any negotiation area in the non-traveling area.

In addition, in the above example, the negotiation area plan 36b of the self-driving vehicle B that has received the non-traveling area plan of the self-driving vehicle A determines, before step S22, whether the planned route of the self-driving vehicle B (already-created planned route) falls within the non-traveling area nα of the self-driving vehicle A, and may perform processing of step S22 and thereafter if the planned route of the self-driving vehicle B does not fall within the non-traveling area nα of the self-driving vehicle A. If the planned route of the moving vehicle B falls within the non-traveling area nα of the self-driving vehicle A, the negotiation area information transmission unit 33b may transmit information indicating agreement with the non-traveling area plan of the self-driving vehicle A without performing the processing of step S22 and thereafter.

The vehicle control system 1 of the present invention receives information on one or more negotiation areas from other self-driving vehicles after transmitting the non-traveling area plan of the self-driving vehicle. Then, the vehicle control system 1 determines one negotiation area permissible to be included in the non-traveling area, or determines not to include any negotiation area in the non-traveling area. The vehicle control system 1, when having determined one negotiation area permissible to be included in the non-traveling area, creates a new non-traveling area plan in which the negotiation area is included in the non-traveling area and transmits the new non-traveling area plan.

Thus, the vehicle control system 1 of the present invention, after transmitting the information to the other vehicle, can change the content of the information according to the response from the other vehicle and transmit the information to the other vehicle again. Furthermore, as a result, it is possible to realize smooth negotiations between self-driving vehicles.

Note that, the operation of the self-driving vehicle A to determine a negotiation area to be included in the non-traveling area from among the negotiation areas indicated by the information received from the self-driving vehicle B may be an operation illustrated below.

For example, the value (second value) of the negotiation area S for the self-driving vehicle B is transmitted from the self-driving vehicle B together with the negotiation area S. The self-driving vehicle A calculates a value (first value) viewed from the host vehicle about the negotiation area S. The self-driving vehicle A determines whether to include the negotiation area S in the non-traveling area, based on both the first value and the second value (typically, based on the difference). In this case, it is preferable that there is some agreed criteria (typically common criteria) for the method of determining a magnitude of the second value and the method of determining a magnitude of the first value.

Also, the threshold value in the above exemplary embodiment is not always predetermined, and may be generated dynamically.

It may be negotiated that the self-driving vehicle A and the self-driving vehicle B exchange money or value equivalent to money and give or get the negotiation area S. The value may be exchanged directly between the self-driving vehicle A and the self-driving vehicle B, or may be exchanged via a third party.

Figure 21:
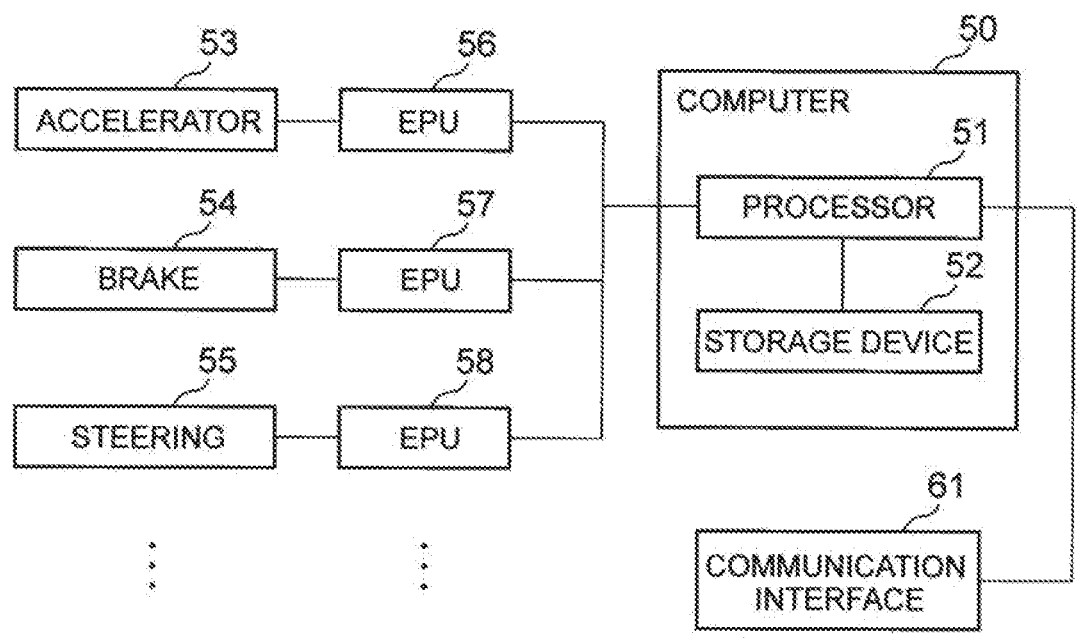
FIG. 21 It depicts a schematic diagram showing an example of a computer for realizing the vehicle control system of the present invention and elements in a self-driving vehicle including the computer.

FIG. 21 is a schematic diagram showing an example of a computer for realizing the vehicle control system 1 of the present invention, and elements in a self-driving vehicle including the computer. The vehicle control system 1 of the present invention is realized by a computer 50. The computer 50 includes a storage device 52 and a processor 51. The operation of the vehicle control system 1 of the present invention is stored in the storage device 52 in the form of a program. The processor 51 reads the program from the storage device 52 and operates as the vehicle control system 1 according to the program.

The self-driving vehicle also includes a communication interface 61. The communication interface 61 is connected to the computer 50, and the processor 51 performs inter-vehicle communication via the communication interface 61.

Further, the processor 51 controls the self-driving vehicle so as to cause the self-driving vehicle to travel along the planned route. For example, the processor 51 outputs control information for controlling an accelerator 53 to an EPU (Electronic Control Unit) 56 corresponding to the accelerator 53, and controls the accelerator 53 via the EPU 56. Similarly, the processor 51 outputs control information for controlling a brake 54 to an EPU 57 corresponding to the brake 54, and controls the brake 54 via the EPU 57. Similarly, the processor 51 outputs control information for controlling a steering 55 to an EPU 58 corresponding to the steering 55, and controls the steering 55 via the EPU 58. Although the accelerator 53, the brake 54, and the steering 55 are illustrated in FIG. 21, the processor 51 similarly controls other elements in the self-driving vehicle.

Also, some or all of the components shown in FIG. 1 may be realized by a general purpose or special purpose circuit (circuitry), a processor or the like, or a combination thereof. These may be configured by a single chip or may be configured by a plurality of chips connected via a bus. Some or all of the components may be realized by a combination of the above-described circuitry and the like and a program.

Figure 22:
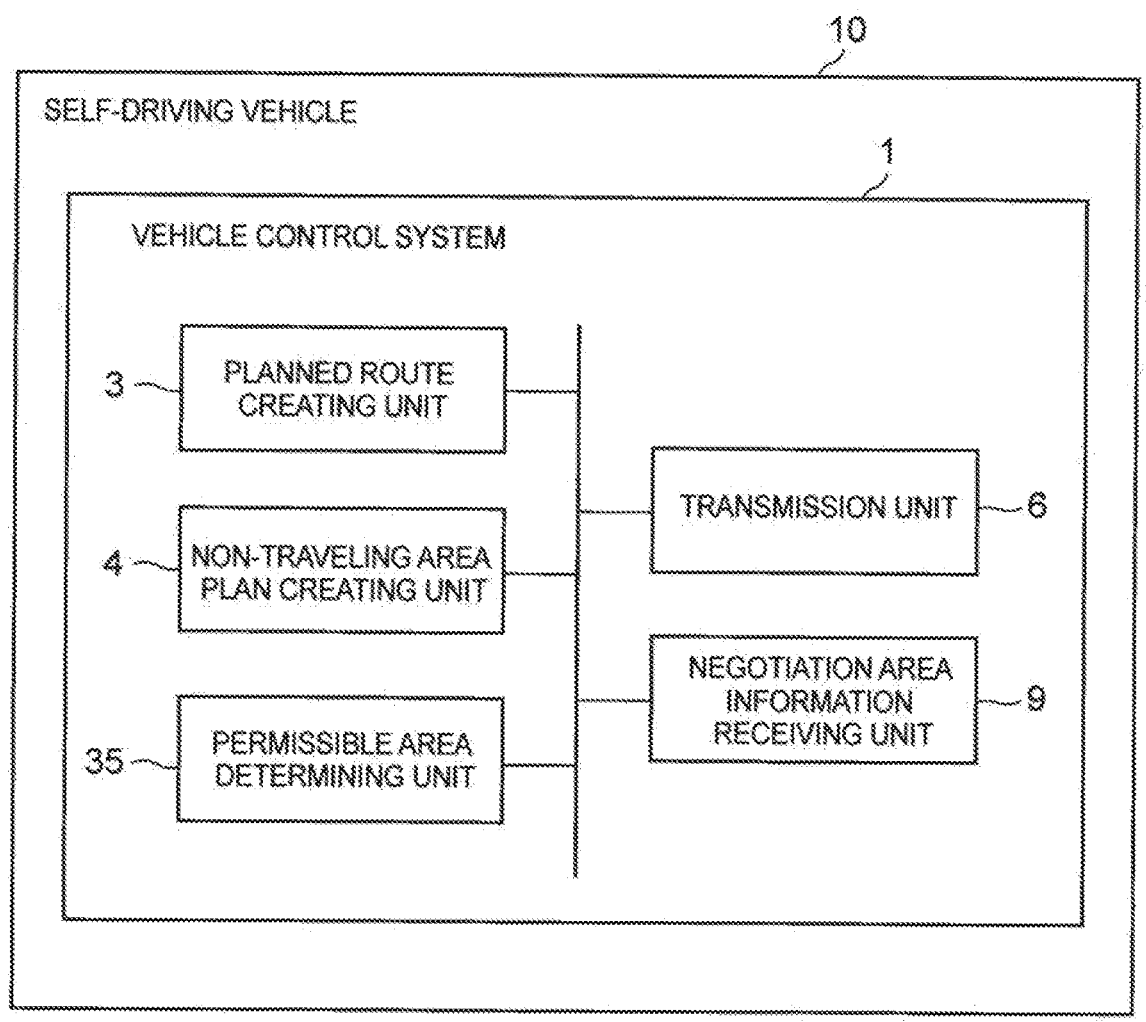
FIG. 22 It depicts a block diagram showing an outline of the present invention.

Next, an outline of the present invention will be described. FIG. 22 is a block diagram showing an outline of the present invention. The vehicle control system 1 of the present invention is provided in a self-driving vehicle 10. The vehicle control system 1 further includes a planned route creating unit 3, a non-traveling area plan creating unit 4, a transmission unit 6, a negotiation area information receiving unit 9, and a permissible area determining unit 35.

The planned route creating unit 3 creates a planned route of the self-driving vehicle 10.

The non-traveling area plan creating unit 4 creates a plan of the non-traveling area, which is an area where the self-driving vehicle 10 can travel and which is an area set as an area where the self-driving vehicle 10 does not travel.

The transmission unit 6 transmits the plan of the non-traveling area to the other vehicle.

The negotiation area information receiving unit 9 receives, from another vehicle, information on one or more negotiation areas each of which is an area other than the non-traveling area and which is a subject of negotiation to be included in the non-traveling area.

The permissible area determining unit 35 calculates, for each negotiation area, the first value which is the value of the negotiation area indicated by the information for the self-driving vehicle 10, and based on the first value calculated for each negotiation area, determines one negotiation area permissible to be included in the non-traveling area, or determines not to include any negotiation area in the non-traveling area.

When the permissible area determining unit 35 has determined one negotiation area permissible to be included in the non-traveling area, the non-traveling area plan creating unit 4 creates a new non-traveling area plan in which the negotiation area is included in the non-traveling area.

The transmission unit 6 transmits the new non-traveling area plan to the other vehicle.

With such a configuration, after transmitting information to another vehicle, it is possible to change the content of the information according to the response from the other vehicle and transmit the information to the other vehicle again.

In addition, the permissible area determining unit 35, when calculating the first value of one negotiation area, may be configured to calculate the first value by calculating a difference between the minimum cost of the planned route created in the area excluding the non-traveling area and the negotiation area from the travelable area of the self-driving vehicle 10 and the minimum cost of the planned route created in the area excluding the non-traveling area from the travelable area of the self-driving vehicle 10.

In addition, a receiving unit (for example, the receiving unit 32) that receives a plan of a non-traveling area of another vehicle, a negotiation area determining unit (for example, the negotiation area determining unit 36) that specifies one or more negotiation areas each of which is a subject of negotiation to be included in the non-traveling area of the other vehicle from the area other than the non-traveling area of the other vehicle, calculates, for each of the specified negotiation areas, a second value which is a value of the specified negotiation area for the self-driving vehicle 10, and determines, based on the second value, one or more negotiation areas to be provided in notification to the other vehicle, and a negotiation area information transmission unit (for example, the negotiation area information transmission unit 33) that transmits, to the other vehicle, information on the one or more negotiation areas each of which is determined as a negotiation area to be provided in notification to the other vehicle may be included.

Also, the negotiation area determining unit, when calculating the second value of one negotiation area, may be configured to calculate the second value by calculating a difference between the minimum cost of the planned route created in the non-traveling area of the other vehicle and the minimum cost of the planned route created in the area obtained by combining the non-traveling area of the other vehicle and the negotiation area.

Further, the non-traveling area plan creating unit 4 may be configured to create a plan of the non-traveling area on the basis of the planned route or a plurality of planned routes obtained in the process of creating the planned route.

The present invention may also be applied to unattended aerial vehicles. When the present invention is applied to an unattended aerial vehicle, the unattended aerial vehicles transmit and receive air areas.

INDUSTRIAL APPLICABILITY

The present invention is suitably applied to a vehicle control system mounted on a self-driving vehicle.

REFERENCE SIGNS LIST

1 Vehicle control system
2 Non-travelable area information storing unit
3 Planned route creating unit
4 Non-traveling area plan creating unit
5 Reference area setting unit
6 Transmission unit
9 Negotiation area information receiving unit
32 Receiving unit
33 Negotiation area information transmission unit
35 Permissible area determining unit
36 Negotiation area determining unit
10 Self-driving vehicle

What is claimed is:

1. A vehicle control system provided in a self-driving vehicle, the vehicle control system, comprising:
at least one memory configured to store instructions; and
at least one processor configured to execute the instructions to:
create a planned route of the self-driving vehicle;
control the self-driving vehicle to travel along the planned route;
create a plan of a non-traveling area, which is an area where the self-driving vehicle can travel and which is an area set as an area where the self-driving vehicle does not travel, while controlling the self-driving vehicle to travel along the planned route;
transmit the plan of the non-traveling area to another vehicle, while controlling the self-driving vehicle to travel along the planned route;
receive, from the other vehicle, information on one or more negotiation areas each of which is an area other than the non-traveling area and which is a subject of negotiation to be included in the non-traveling area, while controlling the self-driving vehicle to travel along the planned route;
calculate, for each negotiation area, a first value which is a value of the negotiation area indicated by the information for the self-driving vehicle, and based on the first value calculated for each negotiation area, determine one negotiation area permissible to be included in the non-traveling area or determine not to include any negotiation area in the non-traveling area, while controlling the self-driving vehicle to travel along the planned route;
create, based on one negotiation area permissible being included in the non-traveling area, a new non-traveling area plan in which the negotiation area is included in the non-traveling area, while controlling the self-driving vehicle to travel along the planned route; and
transmit the new non-traveling area plan to the other vehicle, while controlling the self-driving vehicle to travel along the planned route.

2. The vehicle control system according to claim 1, wherein
the at least one processor is configured to execute the instructions to, when calculating a first value of one negotiation area, calculate the first value by calculating a difference between the minimum cost of a planned route created in an area obtained by excluding the non-traveling area and the negotiation area from the area where the self-driving vehicle can travel, and the minimum cost of a planned route created in an area obtained by excluding the non-traveling area from the area where the self-driving vehicle can travel.

3. The vehicle control system according to claim 1, wherein:
the at least one processor is configured to execute the instructions to:
receive a plan of a non-traveling area of another vehicle;
specify one or more negotiation areas each of which is a subject of negotiation to be included in the non-traveling area of the other vehicle from an area other than the non-traveling area of the other vehicle, calculate a second value which is a value of the specified negotiation area for the self-driving vehicle for each of the specified negotiation areas, and based on the second value, determine one or more negotiation areas to be provided in notification to the other vehicle; and transmit, to the other vehicle, information on the one or more negotiation areas determined as the negotiation areas to be provided in notification to the other vehicle.

4. The vehicle control system according to claim 3, wherein
the at least one processor is configured to execute the instructions to, when calculating a second value of one negotiation area, calculate the second value by calculating a difference between the minimum cost of a planned route created in the non-traveling area of the other vehicle, and the minimum cost of a planned route created in an area obtained by combining the non-traveling area of the other vehicle and the negotiation area.

5. The vehicle control system according to claim 1, wherein
the at least one processor is configured to execute the instructions to create the plan of the non-traveling area on a basis of the planned route or a plurality of planned routes obtained in the process of creating the planned route.

6. The vehicle control system according to claim 2, wherein:
the at least one processor is configured to execute the instructions to:
receive a plan of a non-traveling area of another vehicle;
specify one or more negotiation areas each of which is a subject of negotiation to be included in the non-traveling area of the other vehicle from an area other than the non-traveling area of the other vehicle, calculate a second value which is a value of the specified negotiation area for the self-driving vehicle for each of the specified negotiation areas, and based on the second value, determine one or more negotiation areas to be provided in notification to the other vehicle; and
transmit, to the other vehicle, information on the one or more negotiation areas determined as the negotiation areas to be provided in notification to the other vehicle.

7. The vehicle control system according to claim 6, wherein
the at least one processor is configured to execute the instructions to, when calculating a second value of one negotiation area, calculate the second value by calculating a difference between the minimum cost of a planned route created in the non-traveling area of the other vehicle, and the minimum cost of a planned route created in an area obtained by combining the non-traveling area of the other vehicle and the negotiation area.

8. The vehicle control system according to claim 2, wherein
the at least one processor is configured to execute the instructions to create the plan of the non-traveling area on a basis of the planned route or a plurality of planned routes obtained in the process of creating the planned route.

9. The vehicle control system according to claim 3, wherein
the at least one processor is configured to execute the instructions to create the plan of the non-traveling area on a basis of the planned route or a plurality of planned routes obtained in the process of creating the planned route.

10. The vehicle control system according to claim 4, wherein the at least one processor is configured to execute the instructions to create the plan of the non-traveling area on a basis of the planned route or a plurality of planned routes obtained in the process of creating the planned route.

11. The vehicle control system according to claim 1, further comprising:
an accelerator; and
a first electronic controller configured to control the accelerator,
wherein the at least one processor is further configured to execute the instructions to control the self-driving vehicle to travel along the planned route by controlling first electronic controller.

12. The vehicle control system according to claim 11, further comprising:
a brake; and
a second electronic controller configured to control the brake,
wherein the at least one processor is further configured to execute the instructions to control the self-driving vehicle to travel along the planned route by controlling the second electronic controller.

13. The vehicle control system according to claim 12, further comprising:
a steering module; and
a third electronic controller configured to control the steering module,
wherein the at least one processor is further configured to execute the instructions to control the self-driving vehicle to travel along the planned route by controlling the third electronic controller.

14. The vehicle control system according to claim 13, wherein the at least one processor is further configured to execute the instructions to control the first electronic controller, the second electronic controller and the third electronic controller to autonomously control the self-driving vehicle to travel along the planned route.

15. The vehicle control system according to claim 1, wherein the at least one processor is further configured to execute the instructions to control the self-driving vehicle to autonomously travel along the planned route.

16. A vehicle control method, by a computer provided in a self-driving vehicle, comprising:
creating a planned route of the self-driving vehicle;
controlling the self-driving vehicle to travel along the planned route;
creating a plan of a non-traveling area, which is an area where the self-driving vehicle can travel and which is an area set as an area where the self-driving vehicle does not travel, while controlling the self-driving vehicle to travel along the planned route;
transmitting the plan of the non-traveling area to another vehicle, while controlling the self-driving vehicle to travel along the planned route;
receiving, from the other vehicle, information on one or more negotiation areas each of which is an area other than the non-traveling area and which is a subject of negotiation to be included in the non-traveling area, while controlling the self-driving vehicle to travel along the planned route;
calculating, for each negotiation area, a first value which is a value of the negotiation area indicated by the information for the self-driving vehicle, and based on the first value calculated for each negotiation area, determining one negotiation area permissible to be included in the non-traveling area or determining not to include any negotiation area in the non-traveling area, while controlling the self-driving vehicle to travel along the planned route;

creating, when having determined one negotiation area permissible to be included in the non-traveling area, a new non-traveling area plan in which the negotiation area is included in the non-traveling area, while controlling the self-driving vehicle to travel along the planned route; and transmitting the new non-traveling area plan to the other vehicle, while controlling the self-driving vehicle to travel along the planned route.

17. A non-transitory computer-readable recording medium in which a vehicle control program is recorded, the vehicle control program installed in a computer provided in a self-driving vehicle, the vehicle control program causing the computer to execute:

planned route creation processing for creating a planned route of the self-driving vehicle;

travelling processing for controlling the self-driving vehicle to travel along the planned route;

non-traveling area plan creation processing for creating a plan of a non-traveling area, which is an area where the self-driving vehicle can travel and which is an area set as an area where the self-driving vehicle does not travel, while the travelling processing controls the self-driving vehicle to travel along the planned route;

transmission processing for transmitting the plan of the non-traveling area to another vehicle, while the travelling processing controls the self-driving vehicle to travel along the planned route;

negotiation area information receiving processing for receiving, from the other vehicle, information on one or more negotiation areas each of which is an area other than the non-traveling area and which is a subject of negotiation to be included in the non-traveling area, while the travelling processing controls the self-driving vehicle to travel along the planned route; and permissible area determination processing for calculating, for each negotiation area, a first value which is a value of the negotiation area indicated by the information for the self-driving vehicle, and based on the first value calculated for each negotiation area, determining one negotiation area permissible to be included in the non-traveling area or determining not to include any negotiation area in the non-traveling area, while the travelling processing controls the self-driving vehicle to travel along the planned route, wherein when having determined one negotiation area permissible to be included in the non-traveling area in the permissible area determination processing, creating a new non-traveling area plan in which the negotiation area is included in the non-traveling area, while the travelling processing controls the self-driving vehicle to travel along the planned route, and the transmission processing transmits the new non-traveling area plan to the other vehicle, while the travelling processing controls the self-driving vehicle to travel along the planned route.

* * * * *